United States Patent
Ito et al.

(10) Patent No.: US 7,127,557 B2
(45) Date of Patent: Oct. 24, 2006

(54) RAID APPARATUS AND LOGICAL DEVICE EXPANSION METHOD THEREOF

(75) Inventors: Mikio Ito, Kawasaki (JP); Hidejirou Daikokuya, Kawasaki (JP); Kazuhiko Ikeuchi, Kawasaki (JP); Yukihiro Yoshiya, Kawasaki (JP); Kuniko Omido, Kawasaki (JP); Tadashi Hirano, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 299 days.

(21) Appl. No.: 10/739,353

(22) Filed: Dec. 19, 2003

(65) Prior Publication Data
US 2004/0133743 A1 Jul. 8, 2004

(30) Foreign Application Priority Data
Dec. 26, 2002 (JP) ............................ 2002-378284

(51) Int. Cl.
*G06F 12/00* (2006.01)
(52) U.S. Cl. ................ 711/114; 711/113; 711/154; 711/170; 714/7
(58) Field of Classification Search ............ None
See application file for complete search history.

(56) References Cited

U.S. PATENT DOCUMENTS 6,347,359 B1 * 2/2002 Smith et al. ............. 711/114
2002/0178328 A1 * 11/2002 Honda et al. ............. 711/114

FOREIGN PATENT DOCUMENTS

| JP | 7-306758 | 11/1995 |
| JP | 8-190461 | 7/1996 |
| JP | 10-260788 | 9/1998 |

* cited by examiner

*Primary Examiner*—Mano Padmanabhan
*Assistant Examiner*—Jasmine Song
(74) *Attorney, Agent, or Firm*—Westerman, Hattori, Daniels & Adrian, LLP.

(57) ABSTRACT

A RAID device changes the redundancy of the RAID configuration, while allows various RAID level conversions and capacity increase. Using new and old RAID configuration definition information which define at least a RAID level and a number of logical devices, the control unit performs RLU mapping based on the respective RAID configuration definition information, and performs staging and write back to change the RAID configuration. Therefore various RAID level conversions and capacity increase can be implemented.

20 Claims, 28 Drawing Sheets

FIG. 4
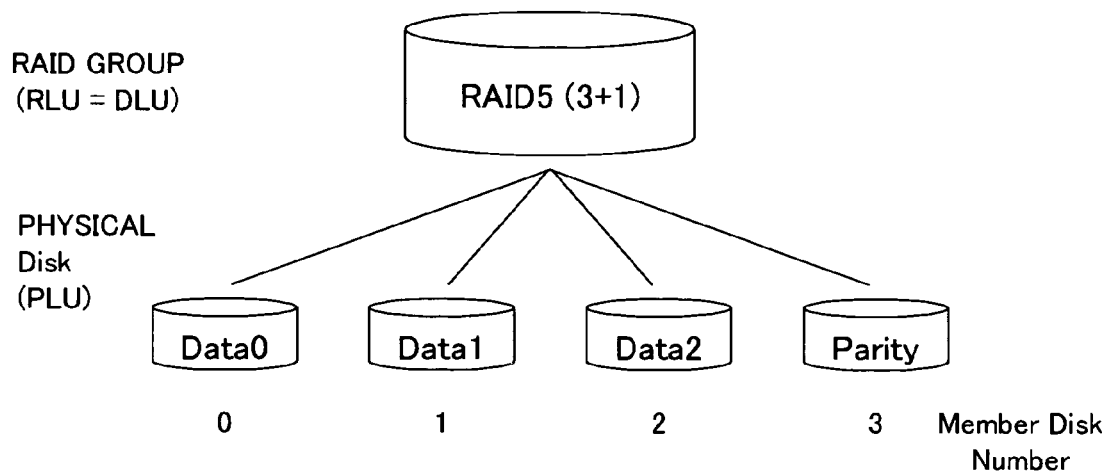
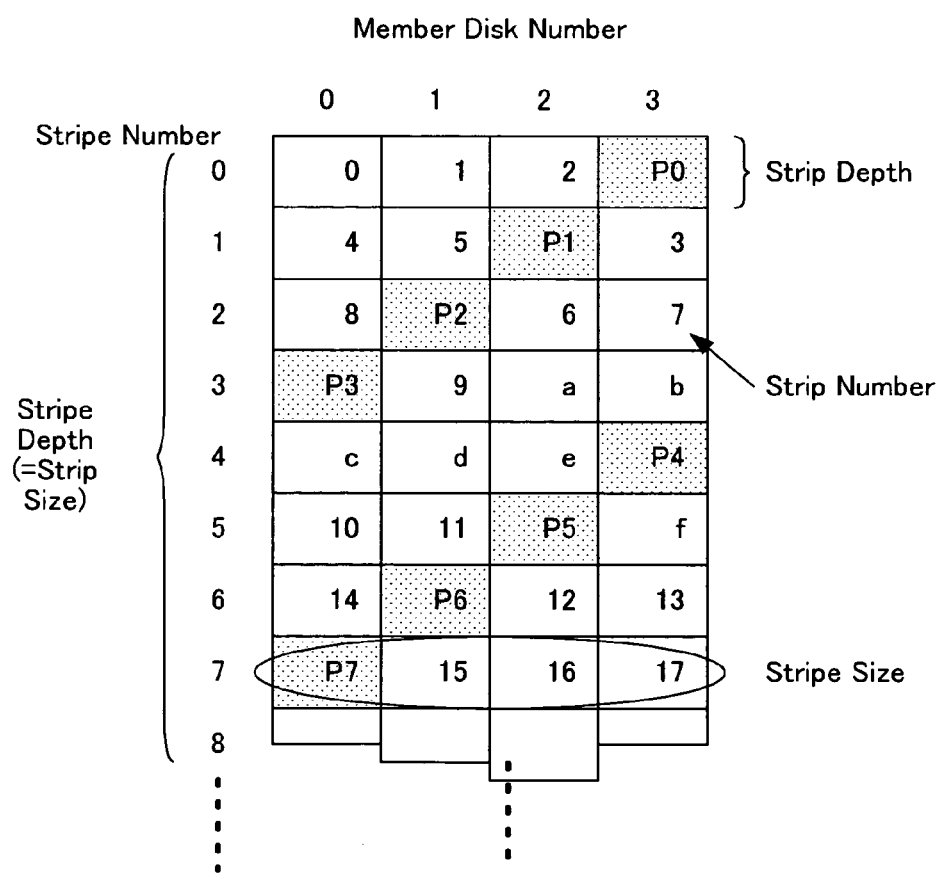

FIG. 14

| | | Configuration Definition Information | | LDE Progress | |
|---|---|---|---|---|---|
| | LUN | ITEM | Before Execution | During Execution | End |
| RAID Definition (New Configuratin) 82 | RLU | Level | RAID5 | ↓ | ↓ |
| | | MemberDisks | 5 | ↓ | ↓ |
| | | PLUNs | 10-14 | 6 | ↓ |
| | | StartLBA | 0 | 10-15 | ↓ |
| | | BlockCount | 400 | ↓ | ↓ |
| | | CheckCode | id#0 | 500 | ↓ |
| | | CVM mode | 0 | ↓ | ↓ |
| | DLU | DLUN | 0 | LDE Flag | 0 |
| | PLU | | | ↓ | ↓ |
| Temporary RAID Definition (Old Configuration) 80 | RLU | Level | – | RAID5 | – |
| | | MemberDisks | – | 5 | – |
| | | PLUNs | – | 10-14 | – |
| | | StartLBA | – | 0 | – |
| | | BlockCount | – | 400 | – |
| | | CheckCode | – | id#0 | – |
| | | CVM mode | – | T Flag | – |
| | DLU | DLUN | – | 255 | – |
| | PLU | – | – | – | – |

FIG. 24

| | Configuration Definition Information | | LDE Progress | | |
|---|---|---|---|---|---|
| LUN | | ITEM | Before Execution | During Execution | End |
| RAID Definition (82) | RLU | RLUN | 0 | ↓ | ↓ |
| | | Level | RAID5 | ↓ | ↓ |
| | | MemberDisks | 4 | 5 | ↓ |
| | | PLUNs | 10–13 | 10–14 | ↓ |
| | | StartLBA | 0 | ↓ | ↓ |
| | | BlockCount | 400 | 500 | ↓ |
| | | CheckCode | id#0 | ↓ | ↓ |
| | | Status (VM mode) | 0 | LDE Flag | 0 |
| | DLU | DLUN | 0 | ↓ | ↓ |
| | PLU | | | | |
| Temporary RAID Definition (80) | RLU | RLUN | – | 255 | – |
| | | Level | – | RAID5 | – |
| | | MemberDisks | – | 4 | – |
| | | PLUNs | – | 10–13 | – |
| | | StartLBA | – | 0 | – |
| | | BlockCount | – | 400 | – |
| | | CheckCode | – | id#0 | – |
| | | Status (VM mode) | – | T Flag | – |
| | DLU | DLUN | – | 255 | – |

FIG. 26

| | Configuration Definition Information | | LDE Progress | | |
|---|---|---|---|---|---|
| | | | | During Execution | |
| | LUN | ITEM | Before Execution | | End |
| RAID Definition | RLU | RLUN | 0 | ↓ | ↓ |
| | | Level | RAID0+1 | RAID5 | ↓ |
| | | MemberDisks | | 4 | ↓ |
| | | PLUNs | | 0~3 | ↓ |
| | | StartLBA | 0 | ↓ | ↓ |
| | | BlockCount | 400 | ↓ | ↓ |
| | | CheckCode | id#0 | ↓ | ↓ |
| | | CVM mode | 0 | LDE Flag | 0 |
| | DLU | DLUN | 0 | ↓ | ↓ |
| | PLU | — | | | |
| Temporary RAID Definition | RLU | RLUN | — | 255 | — |
| | | Level | — | RAID0+1 | — |
| | | MemberDisks | — | 4 | — |
| | | PLUNs | — | 0~3 | — |
| | | StartLBA | — | 0 | — |
| | | BlockCount | — | 400 | — |
| | | CheckCode | — | id#0 | — |
| | | CVM mode | — | T Flag | — |
| | DLU | DLUN | — | 255 | — |
| | PLU | — | — | — | — |

82

80

FIG. 27
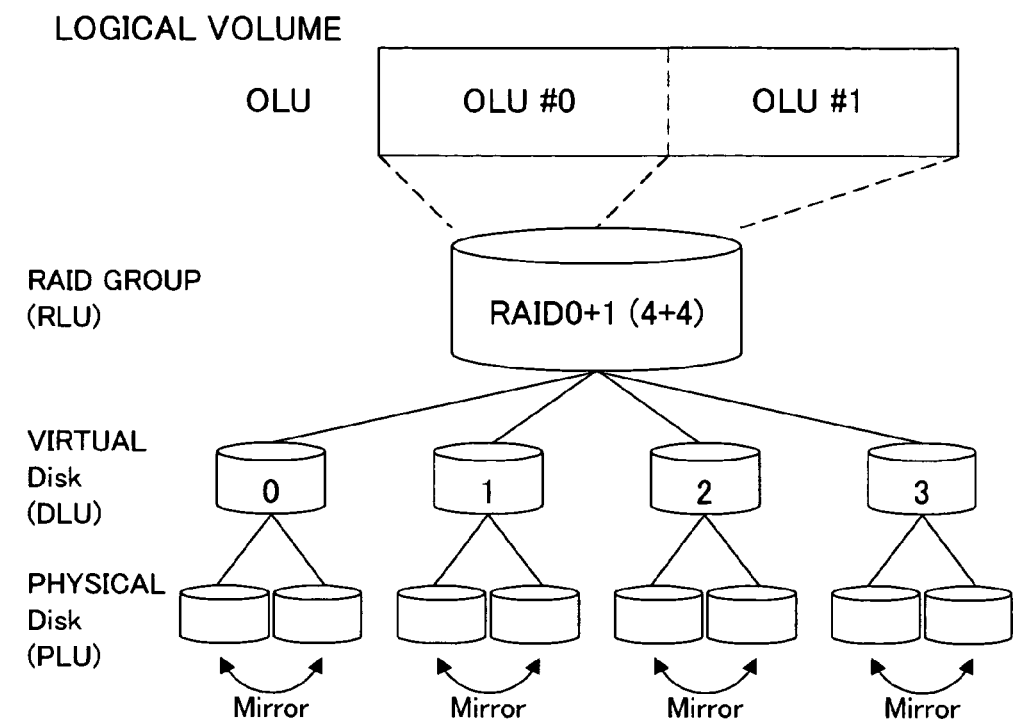
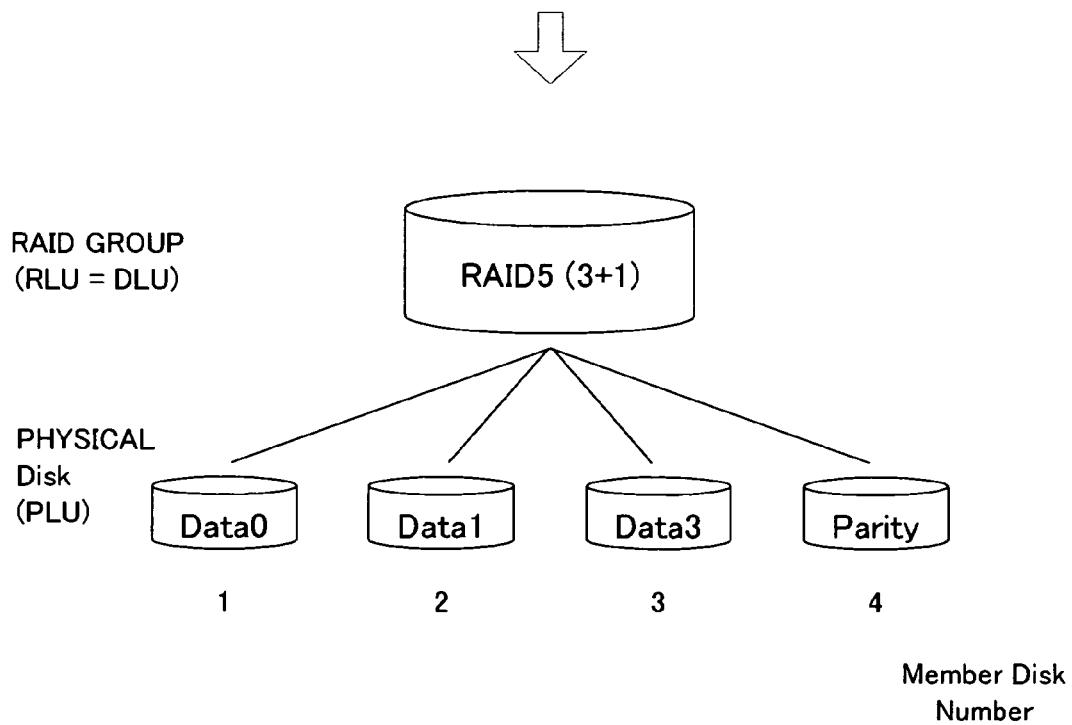

| RLU | | DLU 1 | |
|---|---|---|---|
| RAID Level | 0+1 | Stripe Depth | 128 |
| Stripe Depth | 128 | Stripe Size | 128 |
| Stripe Size | 128x4 | Member Disk Count | 2 |
| Member Disk Count | 4 | DLU 2 | |
| | | DLU 3 | |
| | | DLU 4 | |

| RLU | | DLU | |
|---|---|---|---|
| RAID Level | 5 | Stripe Depth | 128 |
| Stripe Depth | 128x3 | Stripe Size | 128x3 |
| Stripe Size | 128x3 | Member Disk Count | 4 |
| Member Disk Count | 1 | | |

RAID APPARATUS AND LOGICAL DEVICE EXPANSION METHOD THEREOF

CROSS-REFERENCE TO RELATED APPLICATIONS

This application is based upon and claims the benefit of priority from the prior Japanese Patent Application No. 2002-378284, filed on Dec. 26, 2002, the entire contents of which are incorporated herein by reference.

BACKGROUND OF THE INVENTION

1. Field of the Invention

The present invention relates to a RAID apparatus which manages the redundancy of data using a physical disk such as a magnetic disk and a logical device expansion method thereof, and more particularly to a RAID apparatus which increases the capacity of the RAID group or adds redundancy to the RAID group, and the logical device expansion method thereof.

2. Description of the Related Art

In a storage device using such storage medium as a magnetic disk, magneto-optical disk and optical disk, the storage medium is actually accessed by the request of a data processing apparatus. When the data processing apparatus handles large capacity data, a storage system included a plurality of storage devices and a control apparatus is used.

In such a storage system, a redundant configuration is used to improve the reliability of the stored data and the reliability of the device. For the redundant configuration, the disk device normally uses a multiplex configuration of disks called a RAID (Redundant Array of Inexpensive (or Independent) Disks). As RAID functions, RAID 0, RAID 1, RAID 0+1, RAID 2, RAID 3, RAID 4 and RAID 5 are known.

In such a RAID configuration, the RAID level is fixed in the system. However, if the redundancy is increased, the reliability improves but the performance drops, and if the redundancy is decreased, the reliability drops but the performance improves. The redundancy is determined by the system configuration of the user, but there is a demand that the user wants to change the redundancy after installing the system. The redundancy can be easily changed if the system is shutdown.

But when an online system is constructed, it is desirable that the redundancy can be changed in an active status without shutting down the system. Prior proposed method is to change the redundancy in an active status by decreasing or increasing the parity blocks (e.g. Japanese Patent Application Laid-Open No. H7-306758 (see FIG. 2, FIG. 7, FIG. 8).

According to this proposal, in the configuration of RAID 5, data is read from a physical disk group to a cache memory, redundancy is decreased from 2 parities or 1 parity to 1 parity or 0 parity, or redundancy is increased from 0 parity or 1 parity to 1 parity or 2 parities, and the data is written from the cache memory to the physical disk group.

If an I/O request is received from the host during this redundancy conversion processing, the redundancy conversion processing is interrupted and it is judged whether the I/O request is for the area where the redundancy change has completed or for the area where the redundancy has not been changed, and then the I/O request is executed. In the case of redundancy reduction, the actual disks must be decreased, and in the case of redundancy increase, the actual disks must be increased.

In prior art, however, the redundancy can be changed in an active status, but the change of various RAID levels cannot be supported since this is a technology to simply decrease or increase the number of parity blocks, where the range of change of the redundancy is limited.

Further, it is difficult that the demand for increasing the capacity of the RAID group without changing the RAID level in an active status be implemented.

SUMMARY OF THE INVENTION

With the foregoing in view, it is an object of the present invention to provide a RAID apparatus and logical device expansion method for expanding the range of changing the RAID level in an active status.

It is another object of the present invention to provide a RAID apparatus and logical device expansion method for changing the RAID level in an active status without changing the number of physical disks.

It is still another object of the present invention to provide a RAID apparatus and logical device expansion method for increasing the capacity of the RAID group without changing the RAID level in an active status.

To achieve these objects, the present invention is a RAID apparatus for separating data according to a RAID configuration definition and reading/writing from/to a plurality of physical disk devices in parallel. The RAID apparatus has a control unit for accessing the plurality of physical disk devices according to the RLU mapping based on the RAID configuration definition upon an I/O request from a host device, a table for storing old RAID configuration definition information which defines at least the old RAID level and a number of old logical devices and new RAID configuration definition information which defines at least a new RAID level and a number of new logical devices, and a cache memory for temporarily storing data for changing the old RAID configuration to the new RAID configuration. And the control unit reads out the data from the plurality of physical disk devices to the cache memory according to the RLU mapping based on the old RAID configuration definition of the table, and writes the data which was read out to the cache memory to the plurality of physical disk devices according to the RLU mapping based on the new RAID configuration definition of the table.

The logical device expansion method of the present invention is a logical device expansion method for a RAID device which separates data according to a RAID configuration definition and reads/writes the data from/to a plurality of physical disk devices in parallel. The method has a step of reading out the data from the plurality of physical disk devices to the cache memory according to an RLU mapping based on an old RAID configuration definition information which defines at least an old RAID level and an old number of logical devices, and a step of writing the data which was read out to the cache memory to the plurality of physical disk devices according to an RLU mapping based on a new RAID configuration definition information which defines at least a new RAID level and a new number of logical devices.

In the present invention, the old and new RAID configuration definition information, where at least a RAID level and a number of logical devices are defined, are used, and RLU mapping is performed using the respective RAID configuration definition information, and the RAID configuration is changed, so various conversions of RAID levels and a capacity increase can be implemented.

In the present invention, it is preferable that the control unit performs RAID level conversion processing by reading out the data from the plurality of physical disk devices to the cache memory according to the RLU mapping based on the RAID level of the old RAID configuration definition and writing the data, which was read out to the cache, to the plurality of physical disk devices according to the RLU mapping based on the RAID level of the new RAID configuration definition.

In the present invention, it is preferable that the control unit performs capacity increase processing by reading out the data from the plurality of physical disk devices to the cache memory according to the RLU mapping based on the number of logical devices in the old RAID configuration definition, and writing the data, which was read out to the cache memory, to the plurality of physical disk devices according to the RLU mapping based on the number of logical devices in the new RAID configuration definition.

In the present invention, it is preferable that the control unit executes conversion from the old RAID configuration to the new RAID configuration sequentially and manages the progress status thereof, as well as judges whether an I/O request sent from the host device is for a converted area during conversion, executes the I/O request using the new RAID configuration definition if the I/O request is for a converted area, and executes the I/O request using the old RAID configuration definition if the I/O request is for an unconverted area.

In the present invention, it is preferable that the control unit converts the RLBA based on the new RAID configuration definition to a host LBA, then reads out the data from the plurality of physical disk devices to the cache memory according to the RLU mapping based on the old RAID configuration definition using the host LBA, and writes the data, which was read out to the cache memory, to the plurality of physical disk devices according to the RLU mapping based on the new RAID configuration definition using the RLBA.

In the present invention, it is preferable that the control unit converts the old RAID configuration into the new RAID configuration, and then deletes the old RAID configuration definition from the table.

In the present invention, it is preferable that the control unit creates the new RAID configuration definition in the table according to the instructed parameters of the new RAID configuration definition and the old RAID configuration definition.

In the present invention, it is preferable that the control unit acquires an area of the cache memory corresponding to the conversion area, and then executes conversion from the old RAID configuration into the new RAID configuration sequentially.

In the present invention, it is preferable that the control unit separates the conversion processing in sections to execute the conversion processing a plurality of times when the area of the cache memory corresponding to the conversion area cannot be acquired.

In the present invention, it is preferable that the control unit performs the RLU mapping according to a stripe depth and stripe size corresponding to the stripe of the RAID configuration.

BRIEF DESCRIPTION OF THE DRAWINGS

FIG. 4 is a diagram depicting the logical mapping of the RAID 5 in FIG. 2;

FIG. 14 is a diagram depicting the RAID configuration definition in FIG. 13;

FIG. 24 is a table describing the new and old RAID definitions of the capacity increase in FIG. 8;

FIG. 26 is a table describing the new and old RAID definitions of the RAID level conversion in FIG. 10;

FIG. 27 is a diagram depicting the RAID level conversion based on the new and old RAID definitions in FIG. 26;

DESCRIPTION OF THE PREFERRED EMBODIMENTS

Embodiments of the present invention will now be described in the sequence of storage system, RAID configuration, LDE, LDE general processing, detailed LDE processing, capacity increase processing/RAID level conversion processing and other embodiments.

[Storage System]

Figure 1:
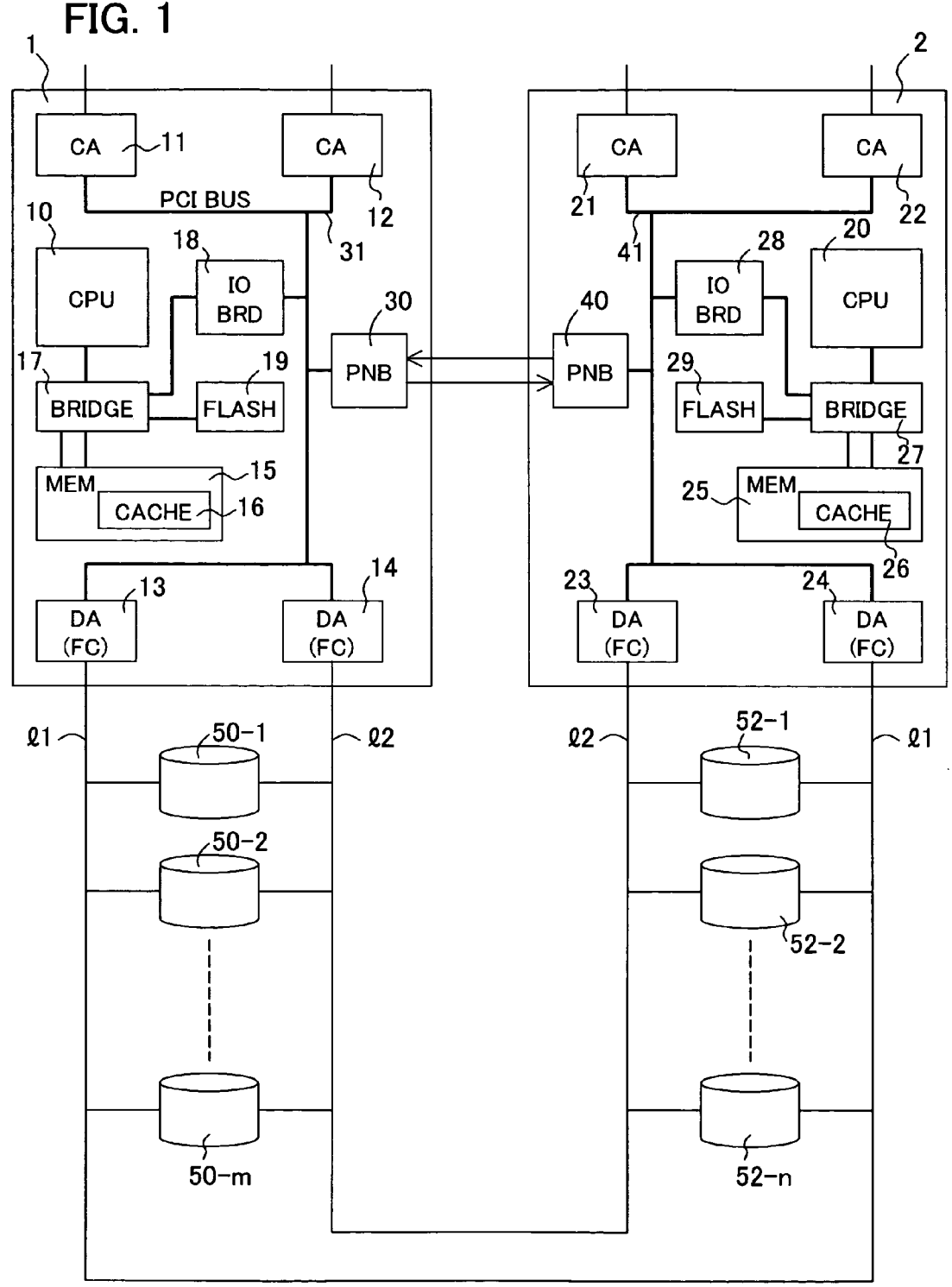
FIG. 1 is a block diagram depicting a storage system according to an embodiment of the present invention.

FIG. 1 is a block diagram depicting the storage system according to an embodiment of the present invention, and shows a RAID (Redundant Arrays of Inexpensive Disks) system using a magnetic disk.

As FIG. 1 shows, the storage system has a pair of magnetic disk controllers (hereafter called controllers) 1 and 2, and many magnetic disk drives 50-1 to 50-m and 52-1 to 52-n which are connected to the pair of controllers 1 and 2 by the lines 11 and 12.

The controllers 1 and 2 are systems which are connected to a host and a server directly or via network equipment so as to read/write a large volume of data of the host and server from/to the RAID disk drive (magnetic disk device) at high-speed and at random. The pair of controllers 1 and 2 have an identical configuration, and has function modules CAs (Channel Adapters) 11, 12/21, 22, CMs (Centralized Modules) 10, 15-19/20, 25-29, and DAs (Device Adapters) 13, 14/23, 24.

The CAs (Channel Adapters) 11, 12/21, 22 are circuits for controlling the host interface which connects the host, and has a fiber channel circuit (FC) and a DMA (Direct Memory Access) circuit, for example. The DAs (Device Adapters) 13, 14/23, 24 are circuits for exchanging commands and data with the disk device so as to control the disk devices 50-1 to 50-m/52-1 to 52-m, and has a fiber channel circuit (FC) and a DMA circuit, for example.

A CM (Centralized Module) has a CPU 10, 20, bridge circuit 17, 27, memory (RAM) 15, 25, flash memory 19, 29 and IO bridge circuit 18, 28. The memory 15, 25 are backed up by a battery, and a part of it is used as a cache memory 16/26.

The CPU 10, 20 is connected to the memory 15, 25, flash memory 19, 29, and IO bridge circuit 18, 28 via the bridge circuit 17. This memory 15, 25 is used as the work area of the CPU 10, 20, and the flash memory 19, 29 stores programs which the CPU 10, 20 executes.

For the programs, the flash memory 19, 29 stores such control programs (modules) as the OS, BIOS (Basic Input/Output System), and control programs (module), such as file access programs and RAID management programs. The CPU 10, 20 executes the programs and executes read/write processing and RAID management processing, for example, as described later.

The PCI (Peripheral Component Interface) bus 31, 41 connects the CAs 11, 12/21, 22 and the DAs 13, 14/23, 24, and connects the CPU 10, 20 and memory 15, 25 via the IO bridge circuit 18, 28. The PCI-node link bridge circuit 30, 40 is also connected to the PCI bus 31, 41. The PCI-node link bridge circuit 30 of the controller 1 is connected to the PCI-node link bridge circuit 40 of the controller 2, and communicates commands and data between the controllers 1 and 2.

In FIG. 1, the controller 1 is in charge of the disk devices 50-1 to 50-m, and the controller 2 is in-charge of the disk devices 52-1 to 52-n, for example. The disk devices 50-1 to 50-m and 52-1 to 52-n have the configuration of the RAID 5.

The cache memory 16, 26 store a part of the data of the disk devices of which the cache memory is in-charge, and stores the write data from the host. The CPU 10, 20 receives the read request from the host via the CAs 11, 12/21, 22, and judges whether access to the physical disk is necessary referring to the cache memory 16, 26, and requests the disk access request to the DAs 13, 14/23, 24 if necessary. The CPU 10, 20 receives the write request from the host, writes the write data to the cache memory 16, 26, and requests the write back, scheduled inside, to the DAs 13, 14/23, 24.

[RAID Configuration]

Figure 2:
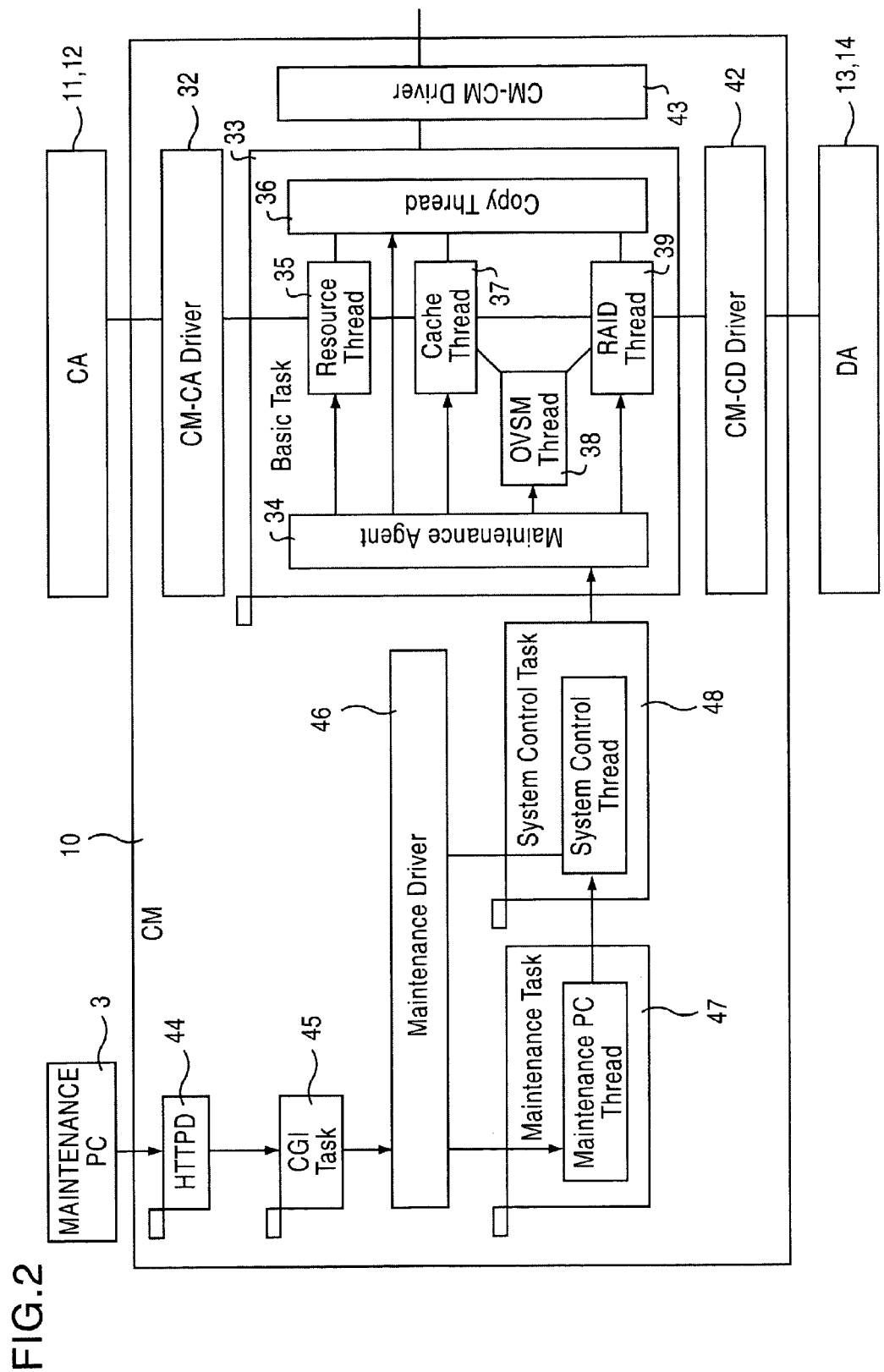
FIG. 2 is a block diagram depicting the control module in FIG. 1.

FIG. 2 is a block diagram depicting the tasks to be executed by the CPU 10, 20 and the control modules. As FIG. 2 shows, the CM-CA driver 32 is a driver for driving the CA 11, 12. The Basic Task 33 is a basic task which the CPU 10 executes, and has a resource thread (resource control module) 35 for performing resource management, copy-thread (copy control module) 36 for performing copy processing, cache thread (cache memory control module) 37 for controlling the cache memory 16, RAID thread (RAID control module) 39 for controlling the RAID configuration, maintenance agent (maintenance control module) 34 and OVSM thread (OVSM control module) 38.

The OVSM thread 38 performs the scheduling of the quick format (QF) and logical device expansion (LDE), requests a logical format (LF) to the RAID thread 39 and manages the LDE progress, as described later. The maintenance agent 34 sends various notifications to the OVSM thread 38.

The CM-DA driver 42 is a drive for driving the CM 13, 14. The CM-CM driver 43 drives the above mentioned PCI-node bridge circuit 30, and performs communication between the CMs.

The maintenance PC (Personal Computer) 3, which is not illustrated in FIG. 1, is connected to the LAN port of the bridge circuit 17, and performs maintenance of the storage system, and in this embodiment, the maintenance PC 3 requests an LDE and displays the LDE progress report, for example. The HTTP driver 44 is a drive of HTTP (Hyper Text Transfer Protocol) with the maintenance PC 3.

The CGI (computer Graphics Interface) task 45 accepts an LDE request from the maintenance PC 3 and reports the progress of the LDE to the maintenance PC 3. The maintenance driver 46 is a drive for the maintenance PC thread 47 and the system control thread 48 for maintenance.

The maintenance PC thread (control module) 47 starts up the system control thread 48 according to the request from the maintenance PC 3. The system control thread (control module) 48 changes the RLU (Raid Logical Unit) table (described later in FIG. 3 and FIG. 14) when QF/LDE is started, instructs the start of QF/LDE to the OVSM thread 38, and changes the RLU table (described later in FIG. 3 and FIG. 14) when the QF/LDE ends.

In this embodiment, the OVSM thread 38 controls the cache thread 37 and the RAID thread 39, and executes LDE processing according to the LDE request from the maintenance PC 3, as described later.

Figure 3:
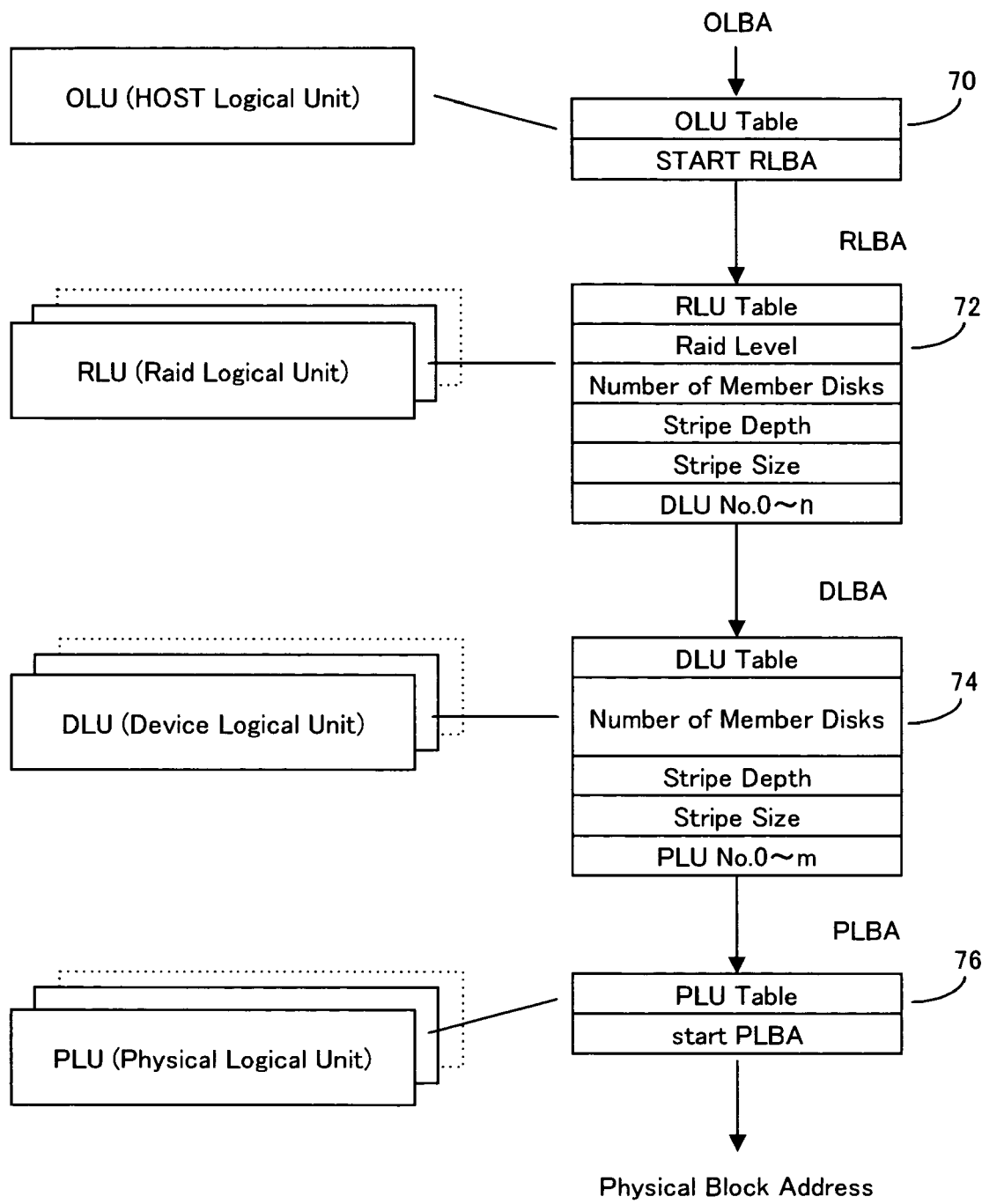
FIG. 3 is a diagram depicting the RAID logical space and the logical table in FIG. 2.
Figure 5:
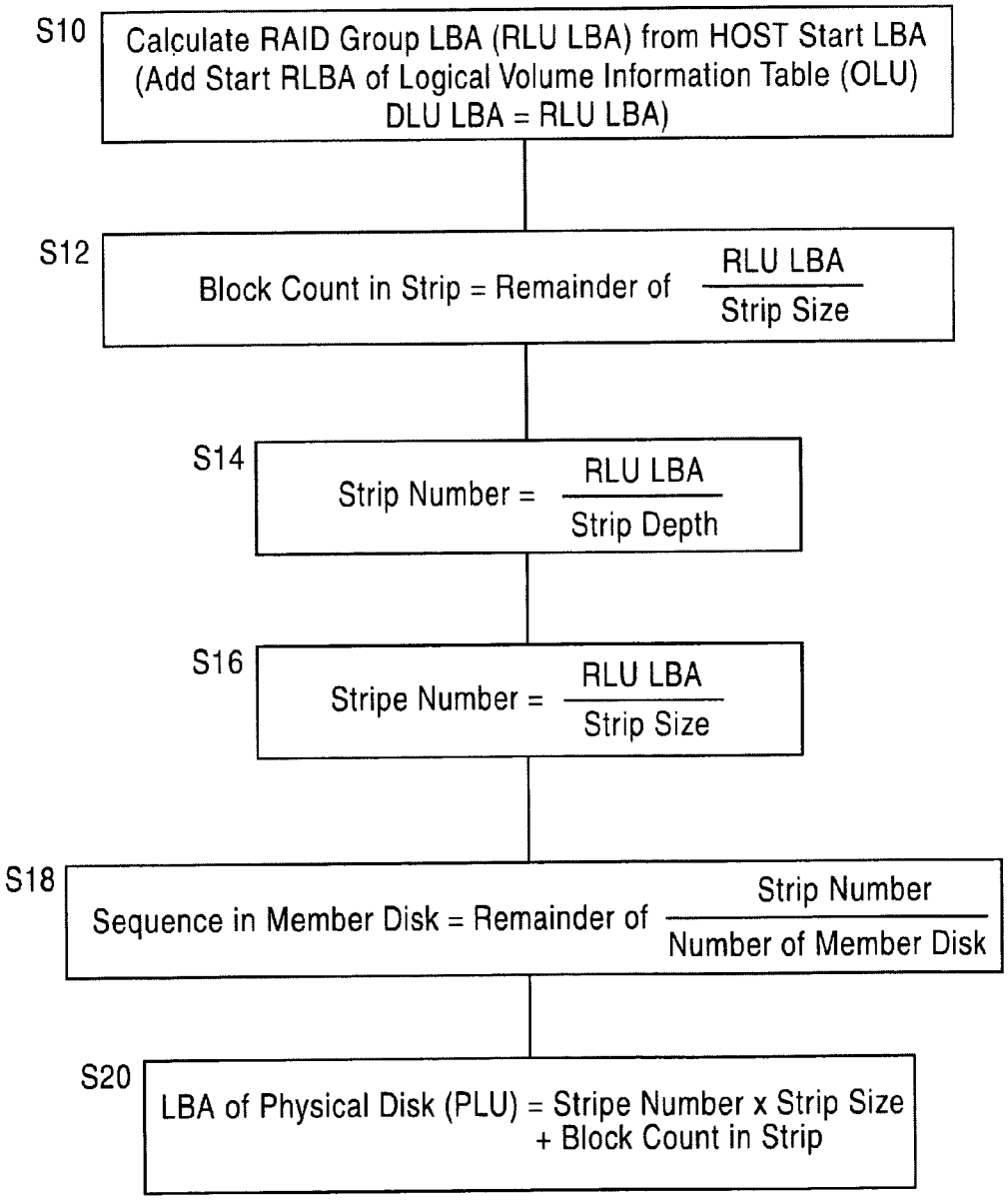
FIG. 5 is a flow chart depicting the PLBA calculation processing of the RAID 5 in FIG. 4.
Figure 6:
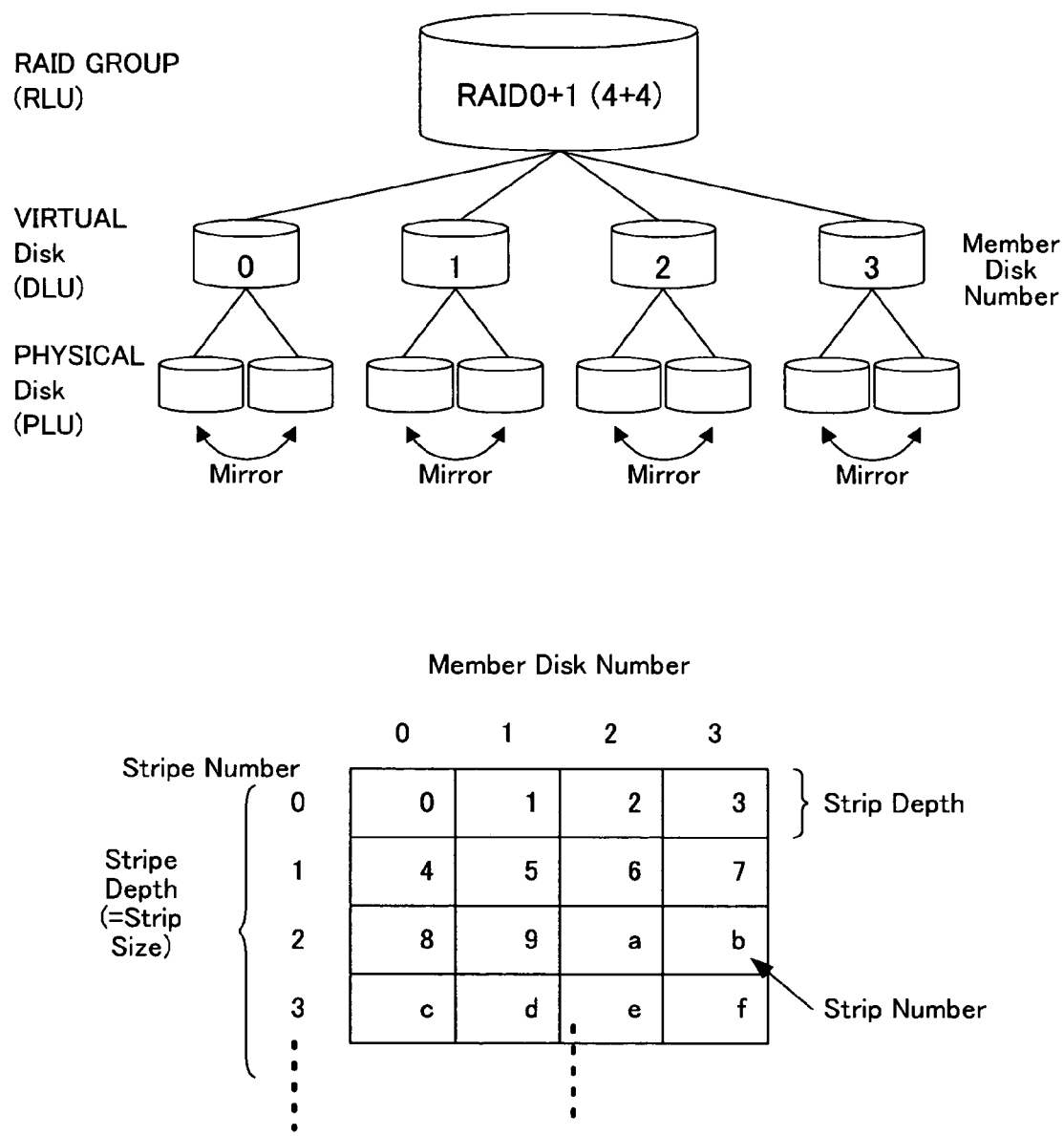
FIG. 6 is a diagram depicting the logical mapping of the RAID 0+1 in FIG. 2.
Figure 7:
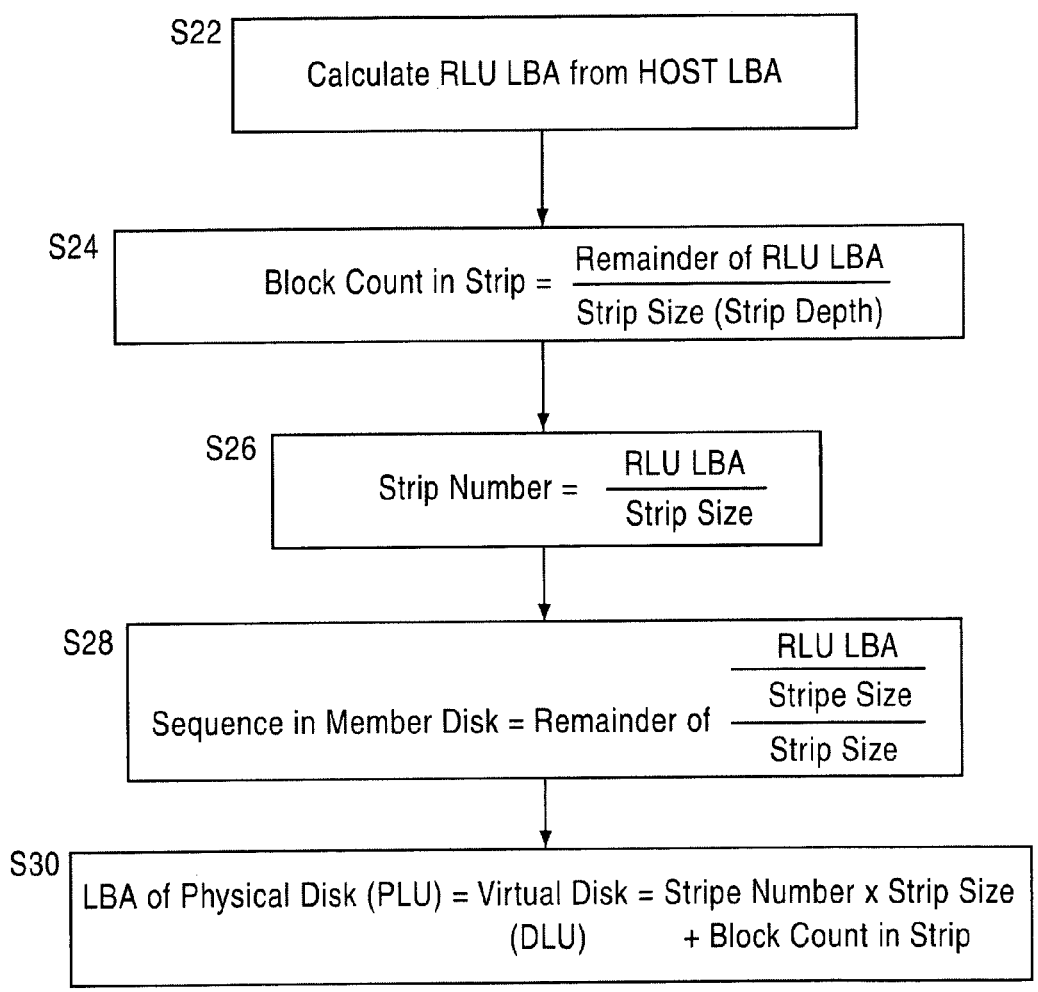
FIG. 7 is a flow chart depicting the PLBA calculation processing of the RAID 0+1 in FIG. 6.

FIG. 3 is a diagram depicting the RAID logical space, FIG. 4 is a diagram depicting the RAID 5, FIG. 5 is a flow chart depicting the address calculation of the RAID 5, FIG. 6 is a diagram depicting the RAID 0+1, and FIG. 7 is a flow chart depicting the address calculation of the RAID 0+1.

As FIG. 3 shows, from the view of the host, the RAID logical space is indicated by the layer structure of OLU (host logical unit) which is the logical space of the host, RLU (RAID Logical Unit) which is the logical space of the RAID group, DLU (Device Logical Unit) which is the logical space of the device constituting the RAID group, and PLU (Physical Logical Unit) which is the logical space of the physical disk.

In the RAID configuration, the RAID logical space is associated with the OLU by the start RLBA (RAID Logical Block Address) of the OLU table 70, and the RAID space is defined by the RLU table 72. The RLU table 72 stores the RAID level, number of member disks, RAID stripe depth, RAID stripe size and the corresponding DLU number.

The DLU space is defined by the DLU table 74. The DLU table 74 stores the number of member disks, RAID stripe-depth, RAID stripe size and the corresponding PLU number. The DLU space and the DLU table 74 are used for mirroring. The PLU space is defined by the PLU table 76. The PLU table 76 stores the start PLBA (physical logical block address).

A concrete description follows. As FIG. 4 shows, in the case of RAID 5 (3+1), RLU=DLU, RLU table 72 is RAID level=RAID 5, number of member disks=4, and the corresponding DLU number=PLU number (0 to 3). The RAID space is striped by the member disks, and the RAID space is mapped by the member disk number and the stripe number. This square is called a strip, to which a strip number is assigned. The size of the strip is defined as the strip depth (or stripe depth), and the size of one stripe is defined by the stripe size.

Therefore as described in FIG. 5, R (RAID group) LBA can be converted into PLULBA and the sequence of the member disk using the number of member disks, strip depth and stripe size.

(S10) RLBA is determined by adding the start RLBA of the OLU table 70 to the host LBA (Logical Block Address).

(S12) The block count in the strip is calculated by the remainder of RLULBA/strip size (stripe depth).

(S14) The strip number is calculated by RLULBA/strip depth.

(S16) The stripe number is calculated by RLULBA/stripe size.

(S18) The sequence of the member disk is calculated by the remainder of the strip number/number of member disks.

(S20) LBA in the physical disk (PLU) is calculated by (stripe number×strip size)+block count in the strip.

The actual-block address is calculated by the sequence of the member disk (PLU number) and PLULBA using the PLU table 76. In the case of the RAID 0+1(4+4), RLU≠DLU, the RLU table 72 is RAID level=RAID 0+1, number of member disks=4 (DLU), and the corresponding DLU number is 0 to 3, as shown in FIG. 6. The RAID space is striped with the DLU member disks, and the RAID space is mapped by the DLU member disk number and stripe number. The square is called a strip, to which the strip number is assigned. The size of the strip is defined as the strip depth (or stripe depth), and the size of one stripe is defined by the stripe size.

Therefore as described in FIG. 7, R (RAID group) LBA can be converted into PLULBA and the sequence of the member disk using the number of member disks, strip depth and stripe size.

(S22) RLBA is determined by adding the start RLBA of the OLU table 70 to the host LBA (Logical Block Address).

(S24) The block count in the strip is calculated by the remainder of RLULBA/stripe depth.

(S26) The stripe number is calculated by the RLULBA/stripe size.

(S28) The sequence of the member disk is calculated by the (remainder of the RLULBA/stripe size)/strip size.

(S30) LBA (=disk of DLU) of the physical disk (PLU) is calculated by (stripe number×strip size)+block count in the strip.

The actual block address is calculated by the sequence of the member disk (DLU number) and PLULBA using the PLU table 76.

[LDE]

LDE will now be described. Logical Device Expansion (LDE) is a function to (1) increase the capacity of the RAID group by adding a disk device or converting the RAID level, and (2) add redundancy to the RAID group by converting the RAID level. The methods of expanding the RAID capacity are adding a new disk device to the RAID group and converting the RAID level.

Figure 8:
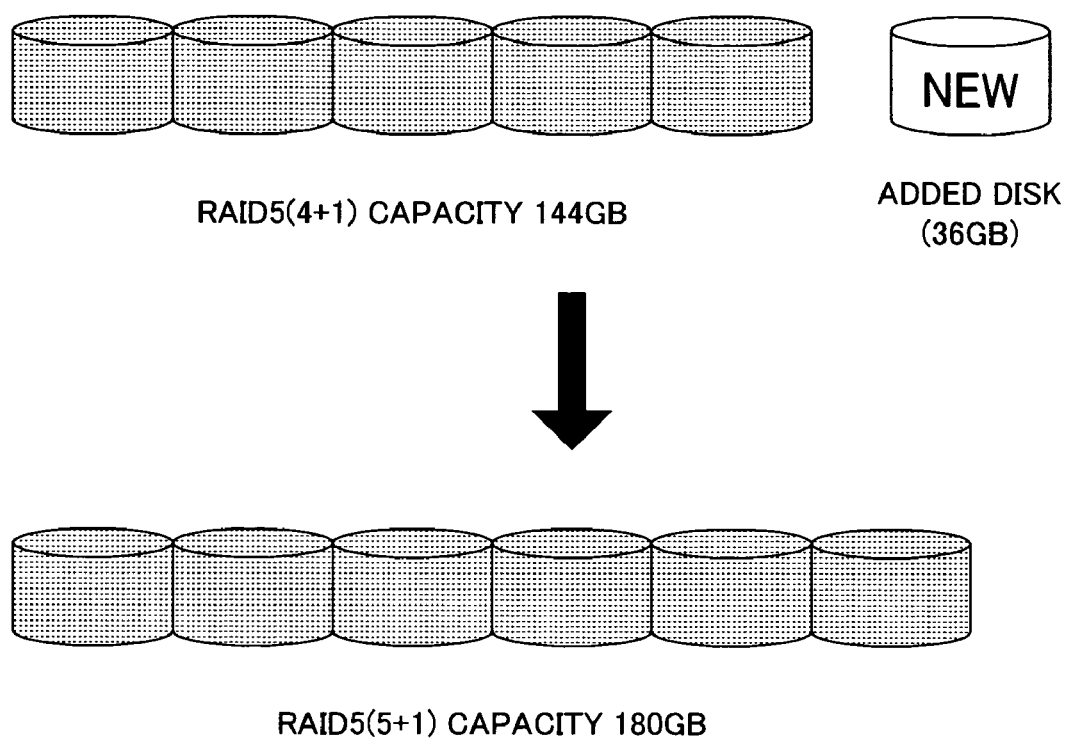
FIG. 8 is a diagram depicting an embodiment of the RAID group capacity increase in FIG. 1.
Figure 9:
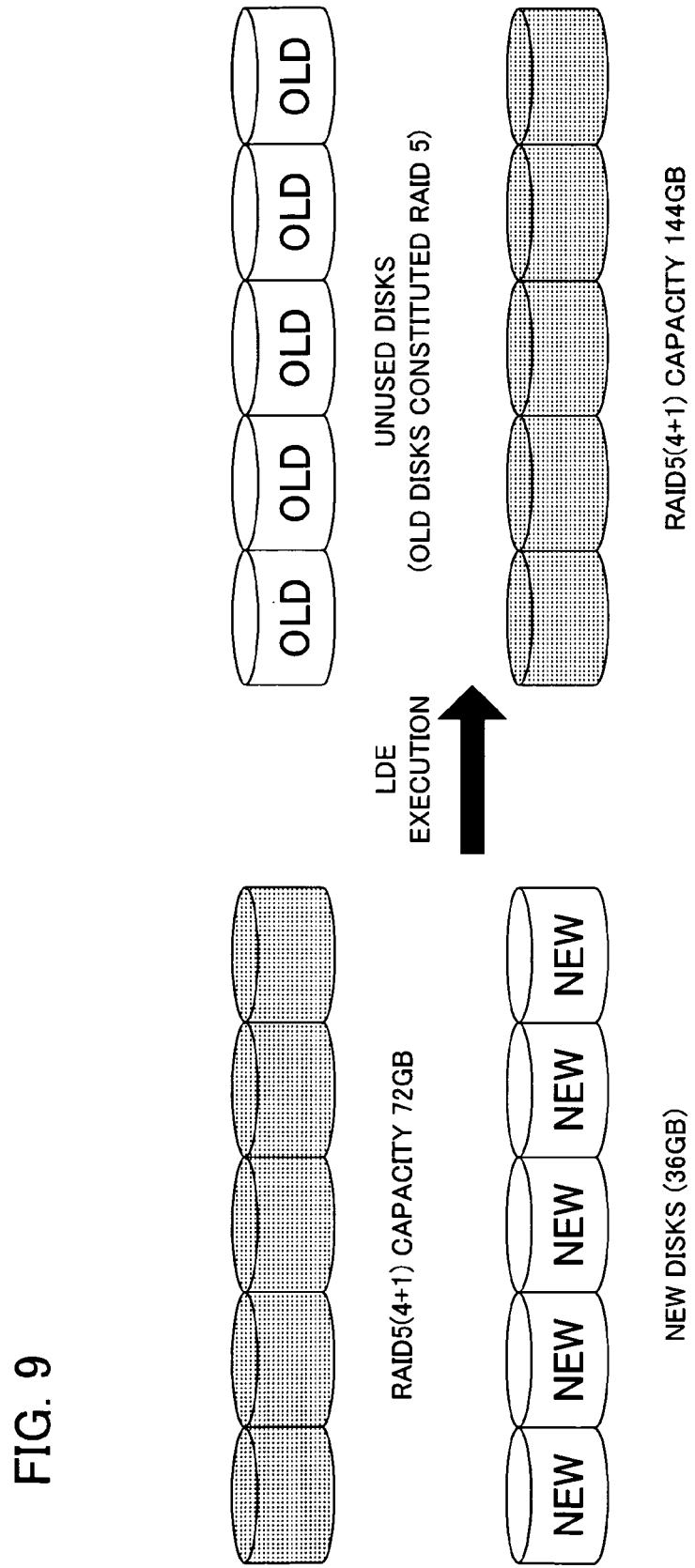
FIG. 9 is a diagram depicting another embodiment of the RAID group capacity increase in FIG. 1.

FIG. 8 and FIG. 9 are diagrams depicting adding a new disk device to the RAID group (capacity increase). A capacity increase is a function to increase the capacity of the RAID group by adding a new disk device (New Disk) while holding the user data in the RAID group.

For example, as FIG. 8 shows, one new disk is added to the RAID 5 (4+1) to be RAID 5 (5+1). If the capacity of the additional disk is 36 GB, the capacity of the RAID group 144 GB is increased to 180 GB.

Also as FIG. 9 shows, the RAID capacity can be expanded by moving all the user data to the RAID group comprised of large capacity new disk devices. For example, the RAID capacity is increased by moving the user data with a 72 GB capacity of RAID 5 (4+1) which is comprised of 18 GB disk devices to a 144 GB capacity of RAID 5 (4+1) which is comprised of 5 new disk devices (36 GB).

Figure 10:
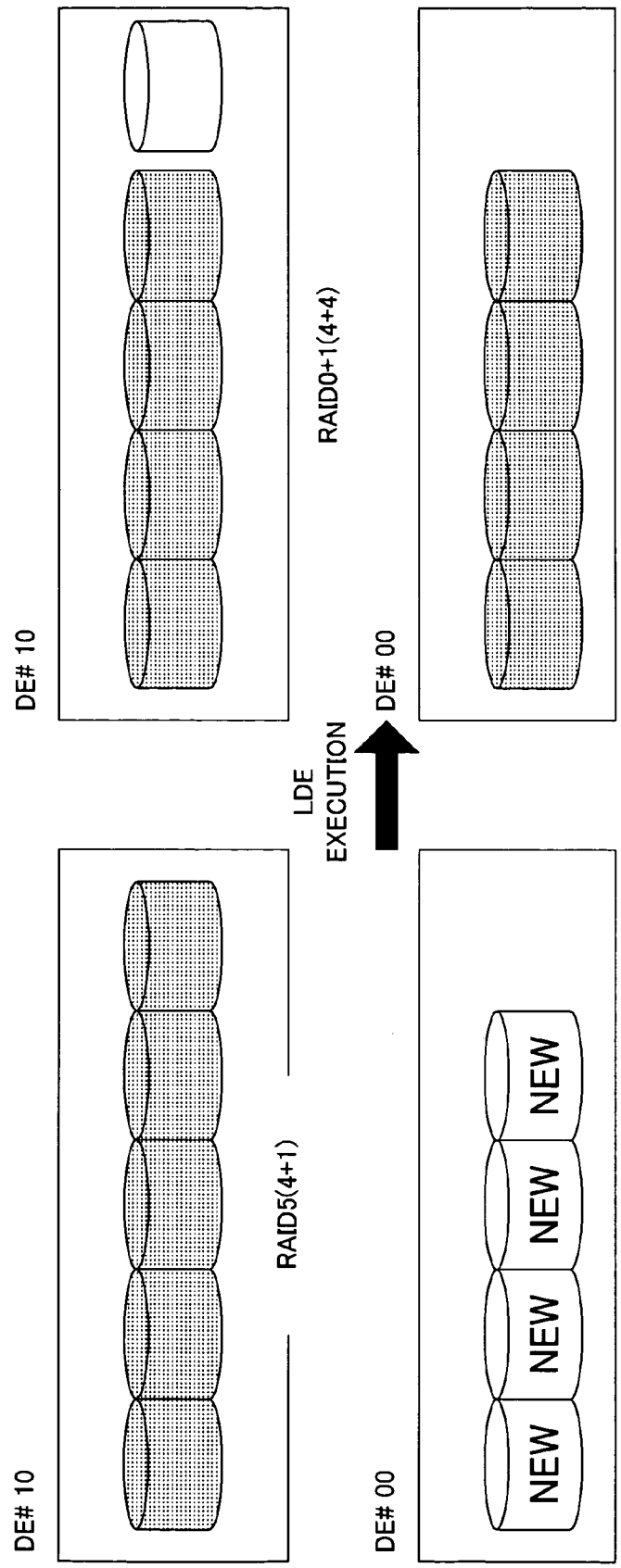
FIG. 10 is a diagram depicting an embodiment of the RAID level conversion in FIG. 1.
Figure 11:
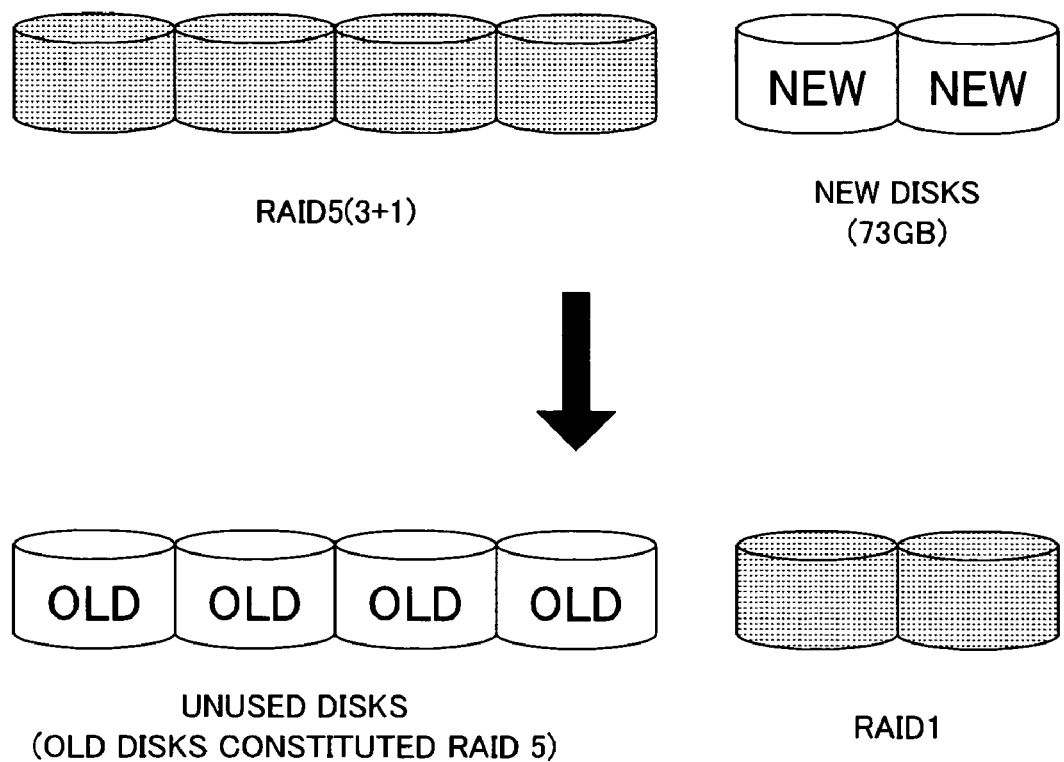
FIG. 11 is a diagram depicting another embodiment of the RAID level conversion in FIG. 1.
Figure 12:
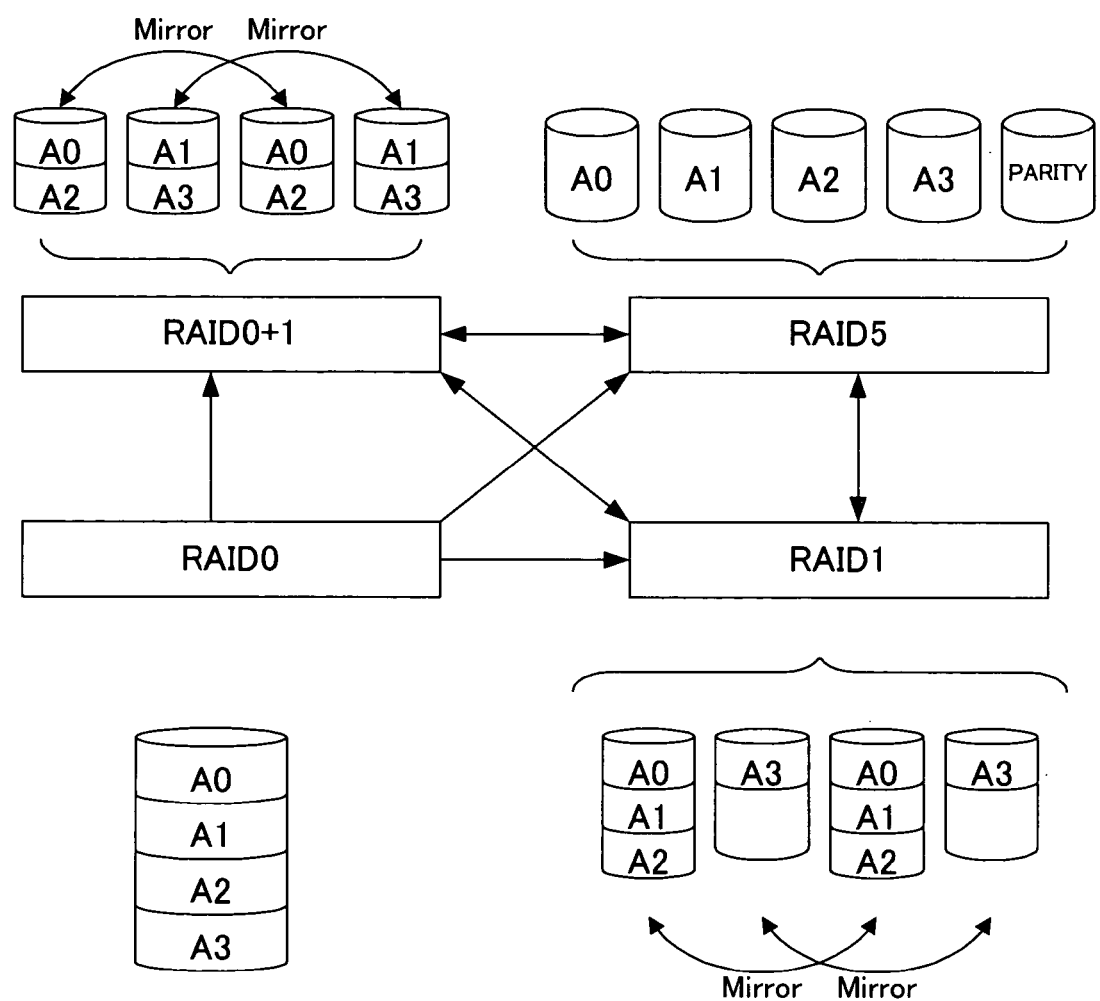
FIG. 12 is a diagram depicting relationships in the RAID level conversion in FIG. 1.

Next, RAID level conversion will be explained. FIG. 10 to FIG. 12 are diagrams depicting the RAID level conversion. The RAID level conversion is a function to change the RAID level while holding the user data in the RAID group.

For example, as FIG. 10 shows, a plurality (4) of new disk devices are added so as to change the RAID 5 (4+1) to the RAID 0+1 (4+4).

The RAID level can be changed using only new disk devices, without using conventional disk devices which constitute the RAID group. For example, as FIG. 11 shows, the RAID 5 (3+1) which is comprised of four 18 GB disk devices is changed to the RAID 1 which is comprised of two 73 GB disk devices.

In the present embodiment, as shown in FIG. 12, the possible RAID conversions are from RAID 0 to RAID 0+1, from RAID 0 to RAID 1, from RAID 0 to RAID 5, between RAID 0+1 and RAID 1, between RAID 0+1 and RAID 5, and between RAID 1 and RAID 5. Conversion to RAID 0 is not performed because of loss of redundancy.

While executing LDE, CM, which is in-charge of LDE, can be switched. LDE can be continued even if a power OFF/ON or power failure/recovery occurs. The CM active expansion and exchange can be executed.

RAID level conversion to the RAID 1 is implemented only with new disks without using conventional disks, and with capacities whereby a new disk must not be larger than a conventional disk. In the RAID level conversion, the conversion to the RAID 0 and the conversion which decrease the capacity is not executed.

[LDE General Processing]

Figure 13:
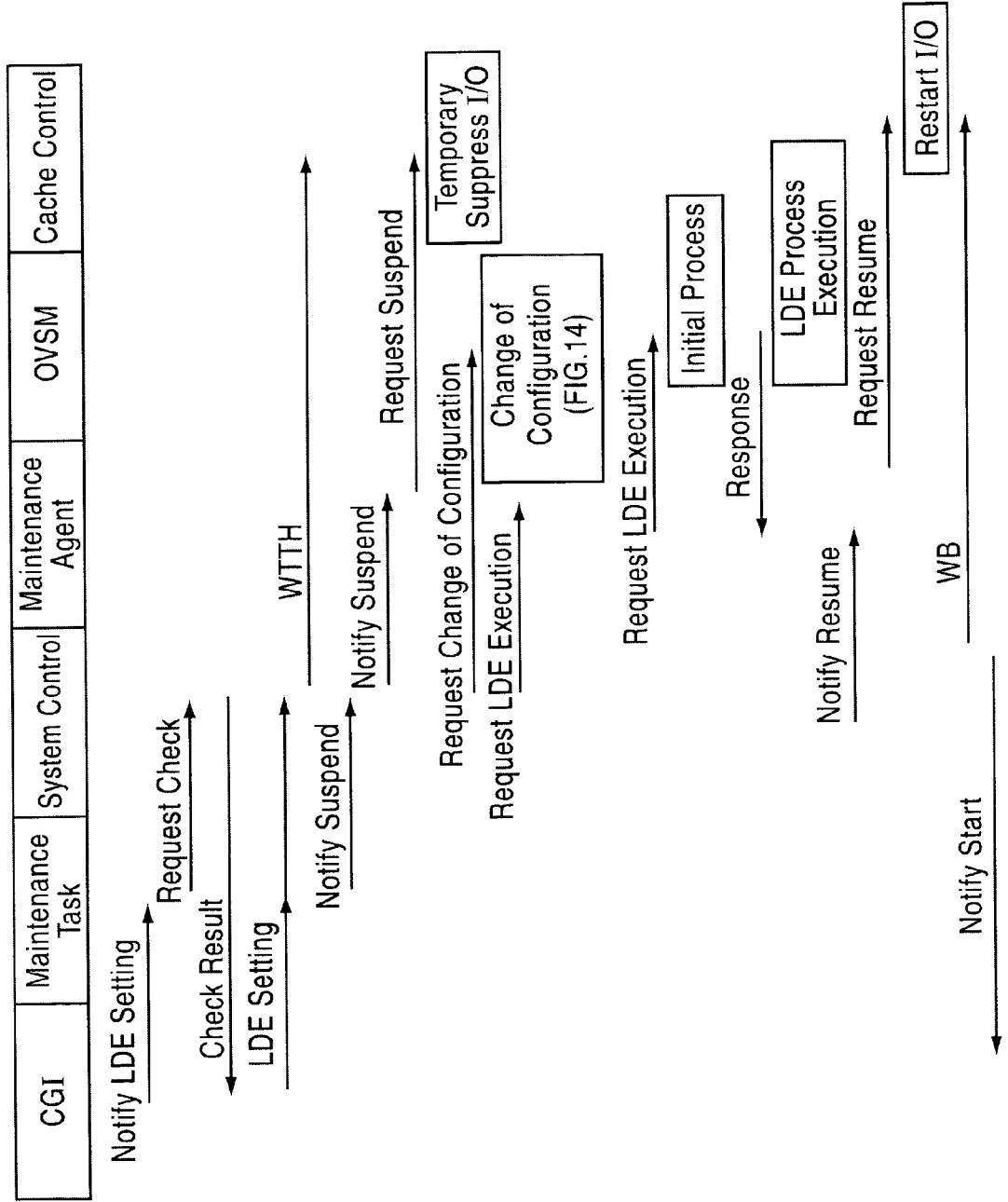
FIG. 13 is a flow chart depicting the general processing of the LDE in FIG. 2.

Now the processing flow from the CGI task 45 during LDE with the configuration in FIG. 2 will be described with reference to FIG. 13 and FIG. 14. At first, the CGI task 45 notifies the maintenance task 47 to set LDE. The parameters at this time are LDE content (e.g. addition, level conversion), RLUN, RAID level, and new member disk as will be described in FIG. 14. The maintenance task 47 checks whether the device status allows the creation of LDE. Also the maintenance task 47 requests the system control module 48 to check whether the setup parameters satisfy the conditions which allow the execution of LDE (see FIG. 12).

The CGI task 45 receives the response from the maintenance task 47 that LDE can be executed, and notifies the maintenance task 47 to set LDE. Responding to this, the maintenance task 47 notifies the system control 48 to set LDE. The system control 48 notifies the cache control 37 to operate with WTTH (Write Through). The cache control 37 operates with WTTH after this.

Then the maintenance task 47 notifies a suspend to the system control 48 to change the configuration. Responding to this, the system control 48 sends the suspend request to the maintenance agent 34. The maintenance agent 34 sends the suspend request to Backend (cache module 37, RAID module 39). By this, all the I/Os including the target RLU are temporarily suppressed.

When suspend processing completes, the system control 48 requests the OVSM 38 to change the configuration. The OVSM 38 creates a configuration to start LDE. As FIG. 14 shows, the OVSM 38 copies the current RAID configuration definition, that is, RLU 72, DLU 74 and PLU 76 to the temporary RAID definition 80 with the old configuration, and creates the RAID definition 82 with the new configuration, that is, RLU 72, DLU 74 and PLU 76 from the above mentioned LDE content (e.g. addition, level conversion), RLUN and RAID level, and the new configuration disk notified from CGI 45. The OVSM 38 distributes the changed content to each module.

After this processing ends, the system control 48 sends the LDE execution request to the maintenance agent 34. Receiving this, the maintenance agent 34 sends the LDE execution request to the OVSM 38. The OVSM 38 executes the LDE initial processing, and returns a reply to the maintenance agent 34. Then the OVSM 38 creates the LDE progress status in FIG. 14, and executes LDE processing. The maintenance agent 34 returns the reply to the system control 48.

Then the system control 48 notifies Resume to the maintenance agent 34. The maintenance agent 34 sends the Resume request to Backend. By this, I/O is restarted. The system control 48 notifies the cache control 37 to return to the WB (Write Back) mode. The system control 37 notifies the start of LDE to the CGI task 45.

Then the CGI task 45 sends the LDE progress information acquisition request to the OVSM 38 via the maintenance task 47, and acquires the progress information. The OVSM 38 changes the configuration, such as setting the LDE Flag of CVM mode to OFF when LDE processing completes, and deletes the old configuration information. The OVSM 38 distributes the configuration to Backend. The OVSM 38 executes the post processing of the LDE processing.

[Detailed LDE Processing]

Figure 15:
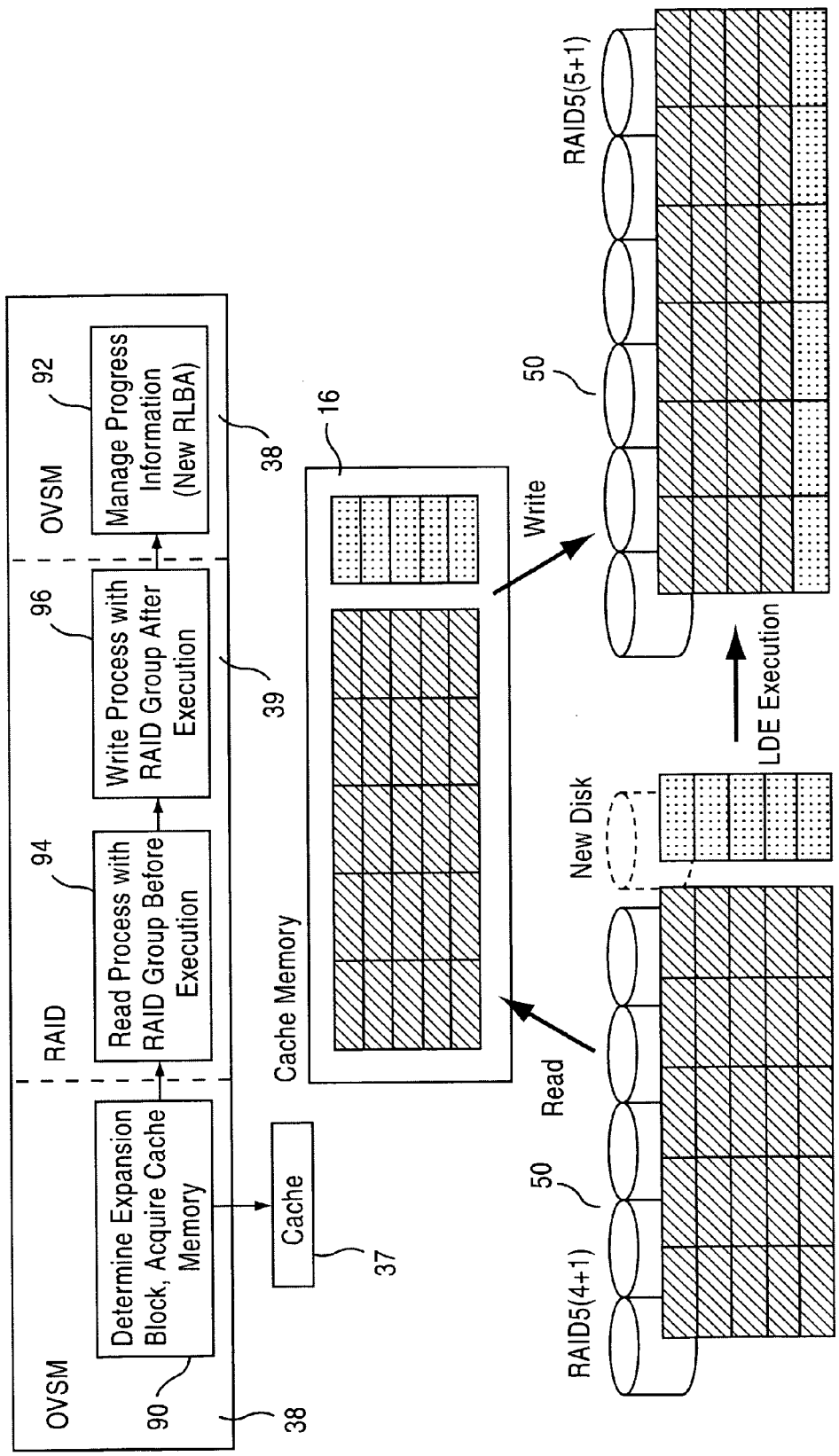
FIG. 15 is a diagram depicting the configuration of the LDE control module in FIG. 2.
Figure 16:
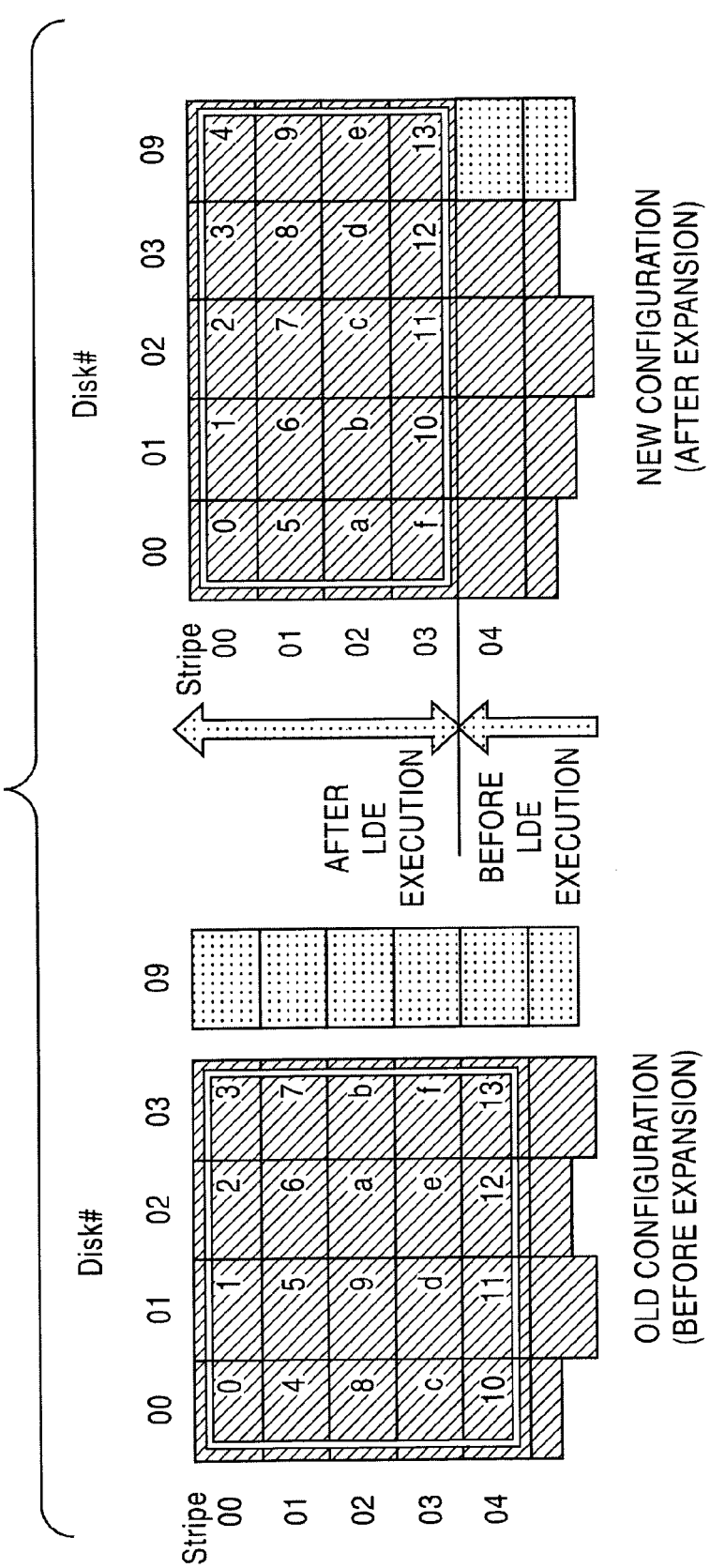
FIG. 16 is a diagram depicting the LDE mapping processing in FIG. 15.
Figure 17:
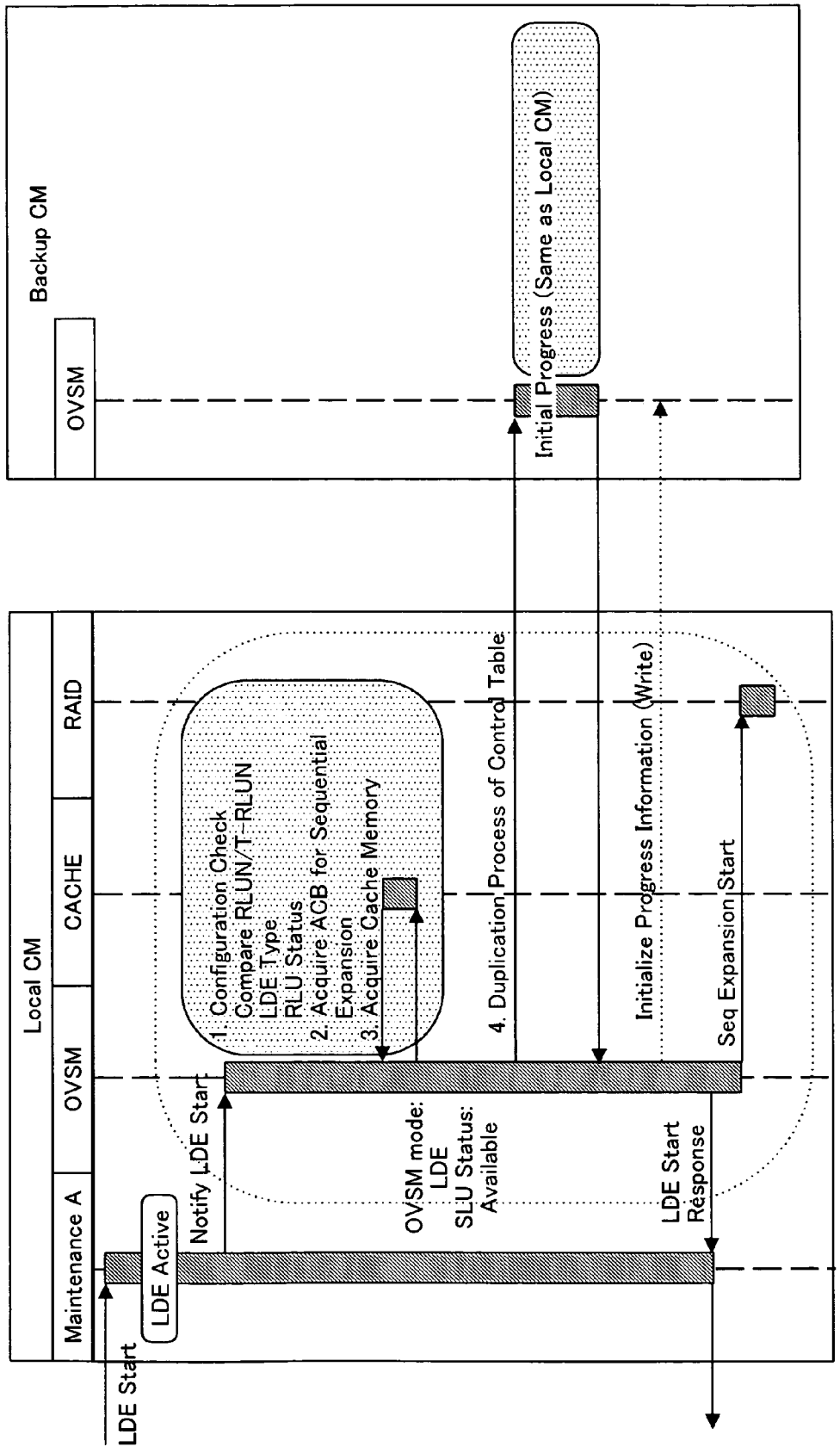
FIG. 17 is a flow chart depicting the detailed processing of the LDE in FIG. 15.
Figure 18:
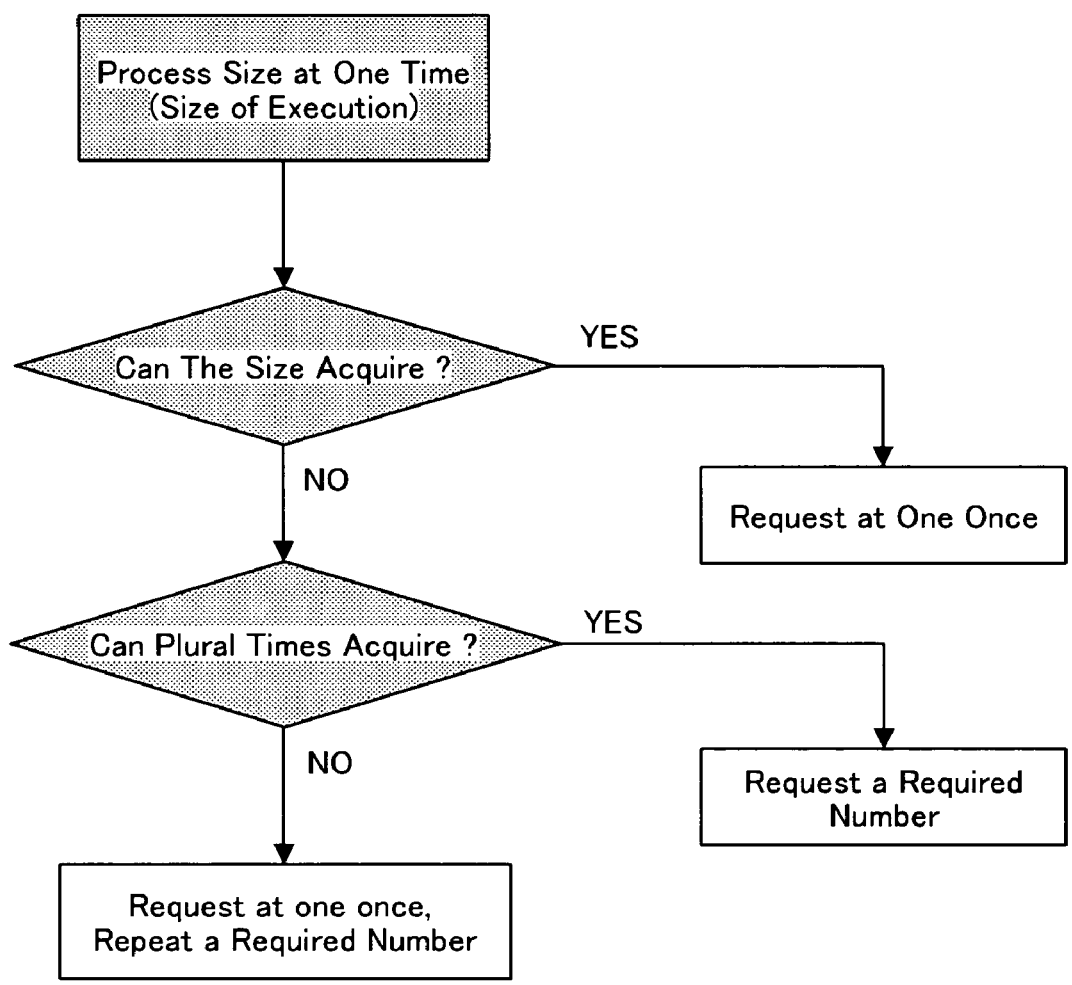
FIG. 18 is a flow chart depicting the cache memory acquisition processing in FIG. 17.
Figure 19:
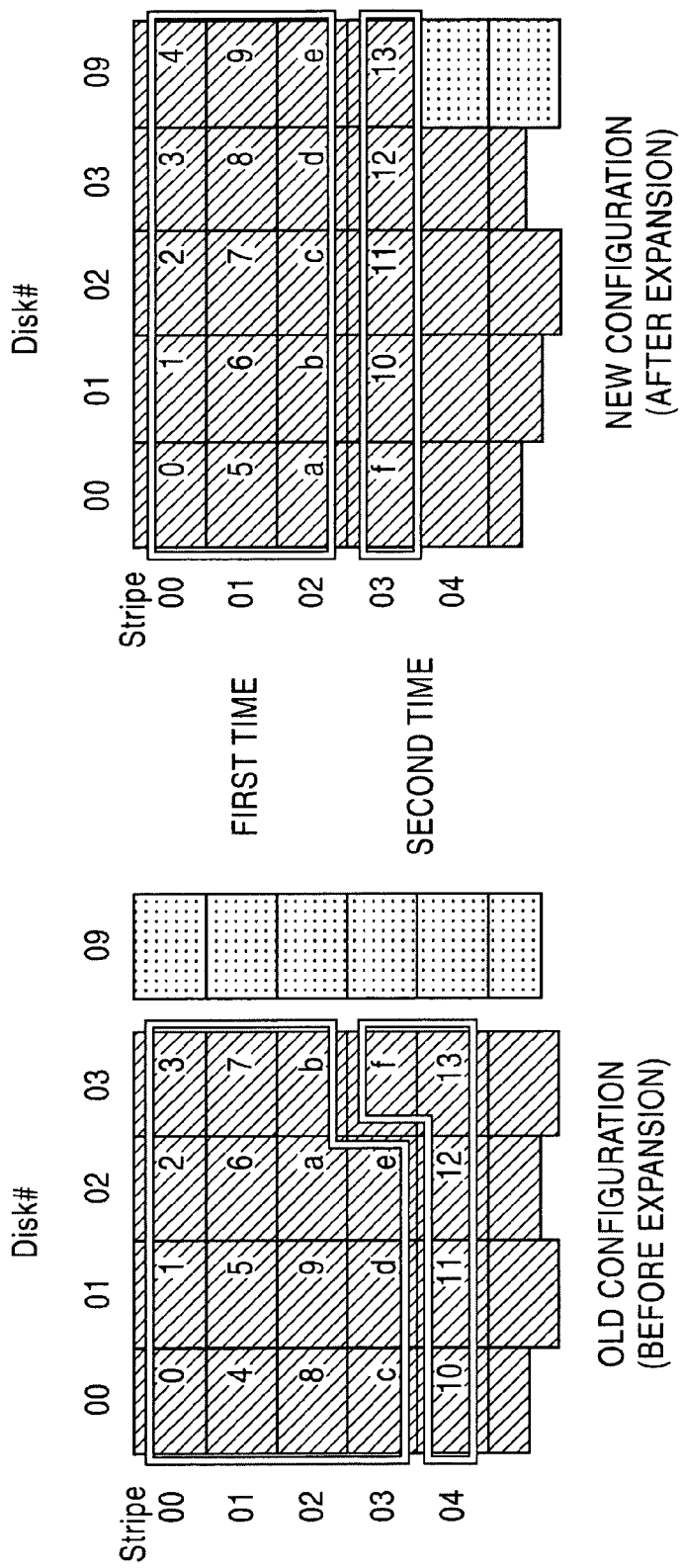
FIG. 19 is a diagram depicting the sequential LDE in FIG. 17.
Figure 20:
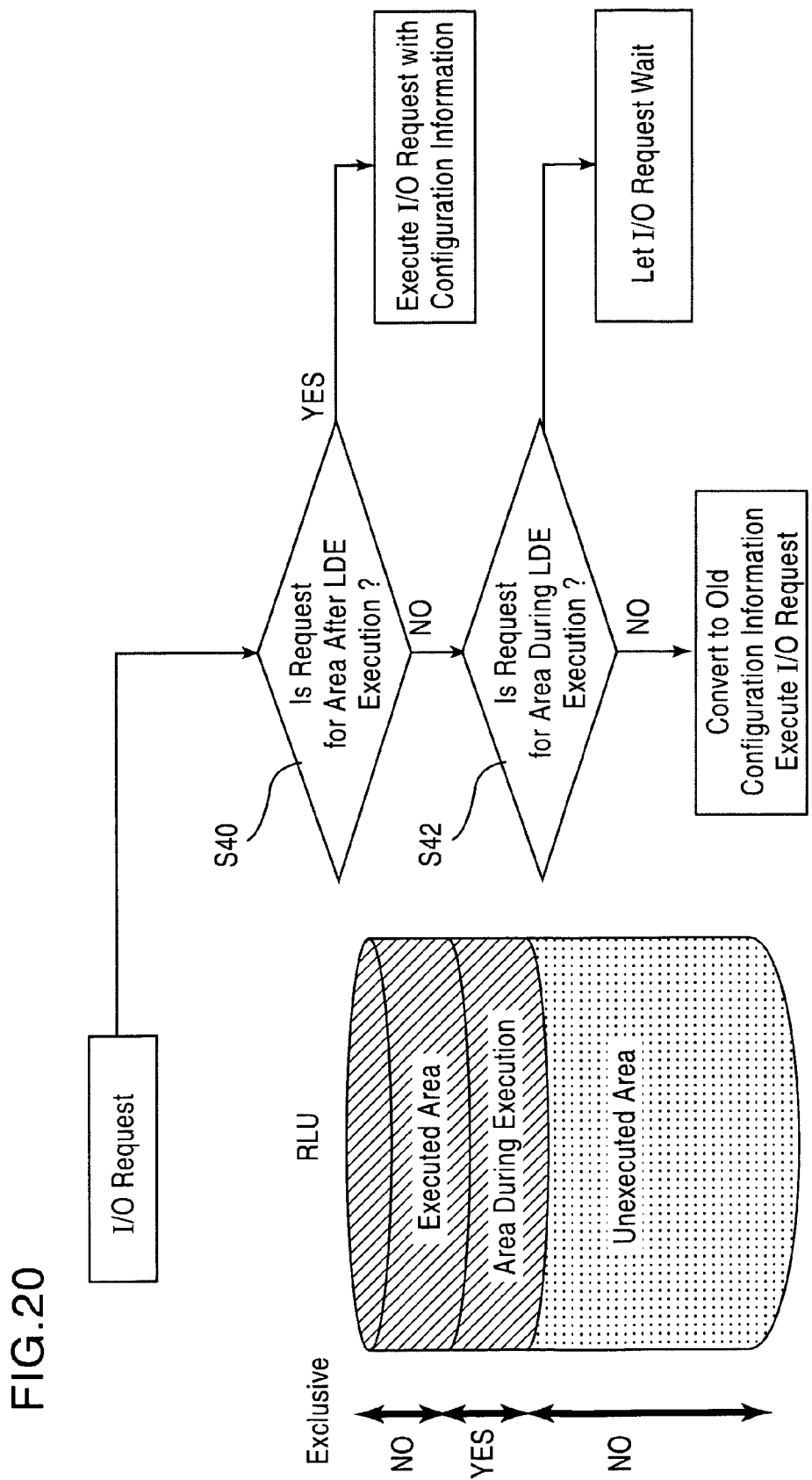
FIG. 20 is a flow chart depicting the I/O contention processing in FIG. 15.

Now LDE processing will be described with reference to FIG. 15 to FIG. 23. FIG. 15 is a block diagram depicting the LDE control module, FIG. 16 is a diagram depicting the LDE processing in FIG. 15, FIG. 17 is a flow chart depicting processing when the LDE in FIG. 15 is started, FIG. 18 is a flow chart depicting the cache memory acquisition processing in FIG. 15, FIG. 19 is a diagram depicting sequential LDE processing in FIG. 15, and FIG. 20 is a flow chart depicting processing at I/O contention according to the progress status management in FIG. 15.

As FIG. 15 shows, the OVSM 38 determines the expansion block, executes the processing 90 for acquiring an area of the cache memory 16, and requests the RAID thread 39 to read/write LDE. Also the OVSM 38 performs processing 92 for managing the LDE progress status of the RAID thread 39.

The RAID thread 39, together with the cache thread 37, performs read processing of the disk device 50 in the RAID group configuration before executing Expansion (old configuration table 80 in FIG. 14), and performs staging processing 94 for the acquired area of the cache memory 16.

Then the RAID thread 39 performs write (write back) processing 96 from the cache memory 16 to the disk device 50 in the RAID group configuration after executing expansion (new configuration table 82 in FIG. 14).

At this time, in LDE, the addresses in read/write processing differ. In the case of expansion, the expansion completes when the read/write processing is executed up to the area including the new disk device. To execute this LDE, as described in FIG. 14, the RAID group configuration information before expansion (old configuration) is continued as temporary RAID group definition information 80, and is deleted when expansion processing ends.

FIG. 16 is a diagram depicting expansion processing (capacity expansion processing) in a RAID, and shows an example when one new disk device is added to the 4 disk devices. The stripes for the number of member disk devices (5 in this case) of the new configuration (inside the frame in FIG. 16) are read from the disk devices (4 units) in the old configuration. Then the stripes for the number of member disks in the old configuration are written to the 5 disk devices in the new configuration. FIG. 16 shows an example when the (4+4) configuration is changed to the (5+5) configuration in RAID 0+1, where 5 stripes are read from the old configuration (4+4) and 4 stripes are written to the new configuration (5+5).

Now the control sequence flow of the OVSM 38 after receiving the LDE start request from the maintenance agent 34 will be described with reference to FIG. 17. The maintenance agent 34 instructs the OVSM 38 to startup the LDE. The parameters at this time are LDE content (e.g. addition, level conversion), RLUN, RAID level, and the new configuration disk.

The OVSM 38 checks the configuration based on the received parameters. In other words, OVSM 38 compares RLUN 82 and T-RLUN 80, and checks the LDE type, for example. And the OVSM 38 acquires ACB (Access Control Block) for sequential expansion. Parallel operation is possible for the number of ACBs. To execute expansion, the cache memory 16 is acquired since data on the disk device is moved (described later in FIG. 18).

Also the OVSM 38 requests the CM of the other system (controller 2 in FIG. 1) to acquire the control table and the cache area. The CM of the other system acquires the control table and the cache area. By this, duplication of the control table and the cache area becomes possible. When the response of the cache area acquisition is received from the other CM, the OVSM 38 notifies the LDE startup response to the maintenance agent 34.

And the OVSM 38 notifies the start of sequential expansion to the RAID thread 39. In other words, the OVSM 38 performs an exclusion of the expansion processing area for one execution and I/O (described later in FIG. 20). And the OVSM 38 requests the RAID thread 39 to read the expansion executing area with the temporary RLUN (configuration before expansion) 80.

The OVSM 38 duplicates the LDE status information with the other system CM. And the OVSM 38 requests the RAID thread 39 to write the expansion executing area with RLUN (configuration after expansion) 82. The OVSM 38 updates the progress information of the expansion executing area, and communicates with the other system CM to perform progress information update processing of the duplicated management table. The OVSM 38 clears the exclusion between the expansion processing area for one execution and the I/O.

Now the cache memory acquisition processing 90 described in FIG. 15 and FIG. 17 will be described with reference to FIG. 18 and FIG. 19. As described in FIG. 15, data on the disk is moved during expansion processing, so data is temporarily saved in the cache memory 16. For this, the cache memory 16 is acquired in advance before executing sequential expansion. In the cache memory 16, the size of the area which can be acquired once is predetermined, so in order to acquire the required capacity, a required number of ACBs are acquired first.

As FIG. 18 shows, the processing size for one execution is determined and it is judged whether the processing size is within a limit size of the cache memory that can be acquired all at once. If the size can be acquired, an acquisition request is sent to the cache thread 37 only once. If the size cannot be acquired, it is judged whether a plurality of times of acquisition is possible, and if a plurality of times of acquisition is possible, the acquisition request is sent to the cache thread 37 for a required number of times, and if a plurality of times of acquisition is not possible, the acquisition request is sent once, and this process is repeated for a number of times. In other words, the LDE of the expansion execution area is separated into sections, and is executed a plurality of times, not all at once. Or parallel processing is performed after the required ACBs are acquired.

For example, in the expansion processing shown in FIG. 19, the expansion area for one execution is read/written for a plurality of times, then processing moves to the next area. This will be described with specifics.

(1) Read processing is executed for the number of stripes after expansion (3 stripes).

(2) Write processing is executed for the area where data was read in (1).

(3) Read processing is executed for the number of stripes after expansion (1 stripe).

(4) Write processing is executed for the area where data was read in (3).

FIG. 19 shows an example of changing the configuration from RAID 0+1 (4+4) to RAID 0+1 (5+5), where the number of expansion blocks=number of old member disks×number of new member disks=4×5=20 blocks (strips), and the number of stripes to be locked=cache memory size÷(number of new member disks×60 KB)=1 MB÷(5×60 KB)=3 stripes. The number of times of expansion execution=number of expansion blocks÷(number of stripes to be locked×number of new member disks)=20÷(3×5)=2 times, and the final number of expansion execution blocks=% of number of expansion blocks·(number of stripes to be locked×number of new member disks)=20%·(3×5)=5 blocks. Here it is assumed that the cache area is 1 MB and the strip is 60 KB.

In the case of the expansion of the RAID configuration from (14+1) to (15+1), the number of expansion blocks=14×15=210 blocks, the number of stripes to be locked is 1 MB÷(15×60 KB)=1 stripe, the number of times of expansion executions=210÷(1×15)=14 times, and the final number of expansion execution blocks=210%·(1×15)=15 blocks.

Now the I/O contention processing of the OVSM 38 will be described with reference to FIG. 20.

(S40) The OVSM 38 judges whether the RLBA of the host I/O request is for the expansion executed area or the unexecuted area using the progress management function 92 which judges whether the RLU is expansion executed, or being expanded or expansion unexecuted depending on the RLBA (see FIG. 15). If for the executed area, an I/O is requested to the RAID thread 39 with the new configuration information, and the host I/O request is executed.

(S42) If for the unexecuted area, it is judged whether the area is in-execution of expansion. If in-execution, the OVSM 38 lets the host I/O request wait until the expansion processing ends, and sends the I/O request to the RAID thread 39 after the expansion processing ends. If the area is not in-execution, this area is an expansion unexecuted area, so the RLU configuration information is switched to the temporary RLU configuration information (old information) 80, and then the OVSM 38 sends the I/O request to the RAID thread 39.

Figure 21:
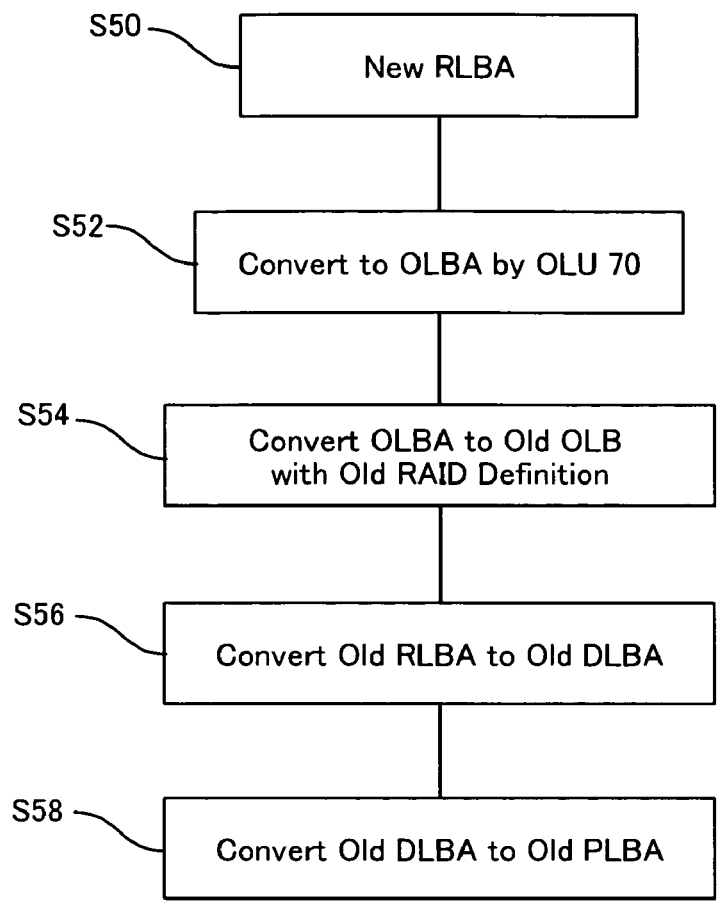
FIG. 21 is a flow chart depicting the read address calculation processing in FIG. 15.

Now the read processing and the write processing described in FIG. 15 will be described with reference to FIG. 21 to FIG. 23. FIG. 21 is a flow chart depicting the read address generation processing of the read processing.

(S50) At first, a new RLBA (RLUBLA) is generated based on the new RAID configuration definition 82.

(S52) Using the OLU table 70 described in FIG. 3, the new RLBA is inverse-converted into OLBA.

(S54) OLBA is converted into the old RLBA using the OLU table 70 with the old configuration.

(S56) The old RLBA is converted into the old DLBA using the RLU table 72 and the DLU table 74 in the old RAID configuration definition.

(S58) Using the PLU table 76 in the old RAID configuration definition, the old DLBA is converted into PLBA, and a read block address is acquired.

The disk device is read using this read block address, and the data is read (staging) to the cache memory 16.

Figure 22:
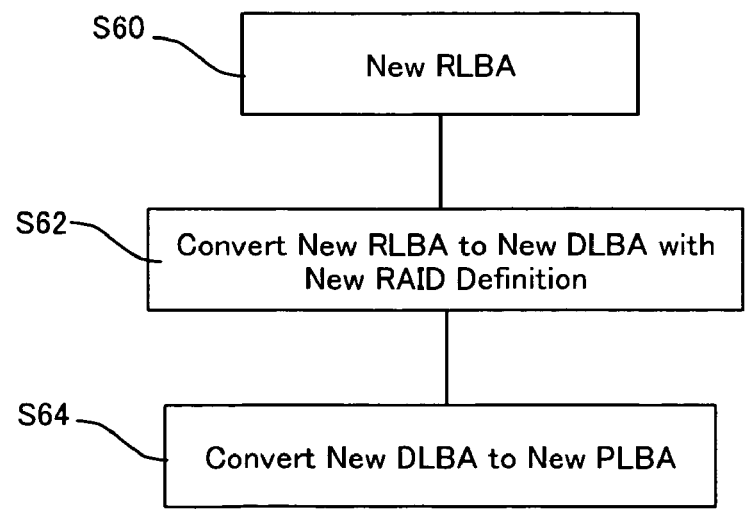
FIG. 22 is a flow chart depicting the write address calculation processing in FIG. 15.

FIG. 22 is a flow chart depicting the write address generation processing of the write processing.

(S60) At first, the new RLBA (RLUBLA) is generated with the new RAID configuration definition 82.

(S62) Using the RLU table 72 and the DLU table 74 in the new RAID configuration definition described in FIG. 3, the new RLBA is converted into the new DLBA.

(S64) Using the PLU table 76 in the new RAID configuration definition, the new DLBA is converted into PLBA and a write block address is acquired.

The data of the cache memory 16 is written-back to the disk device using this write block address.

Figure 23:
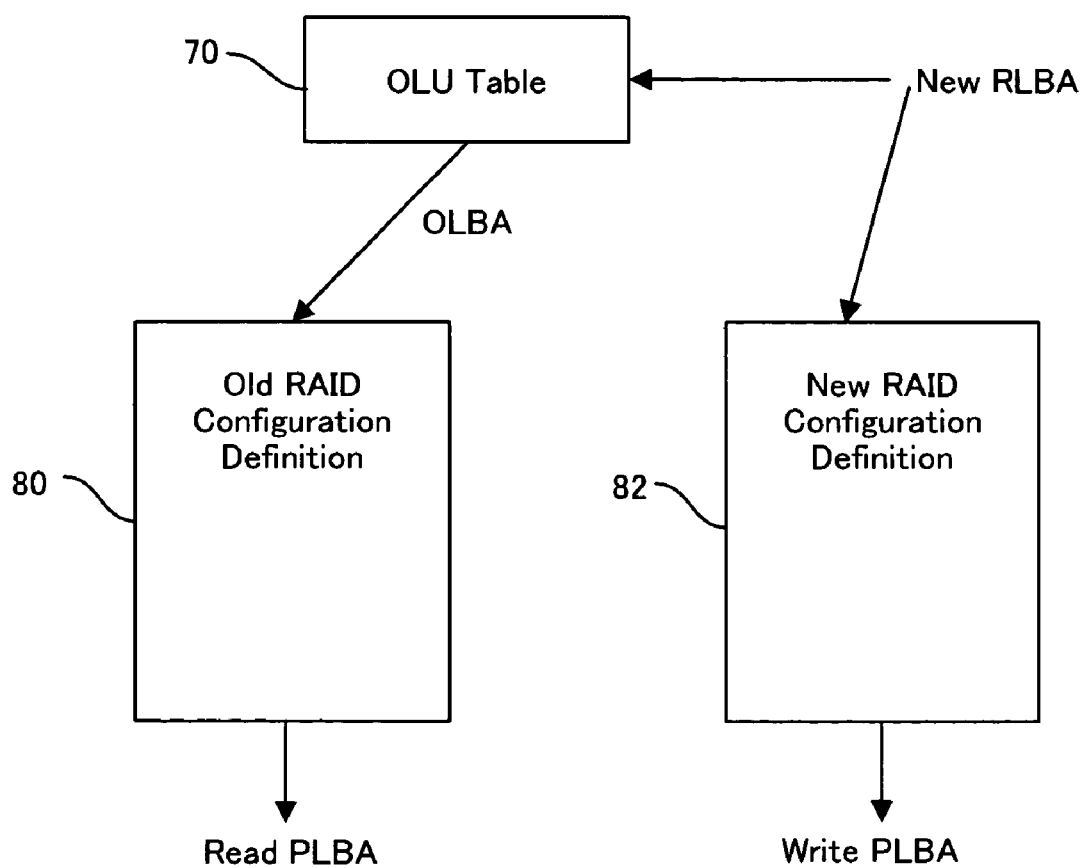
FIG. 23 is a diagram depicting the address conversion processing in FIG. 21 and FIG. 22.

FIG. 23 is a diagram depicting this relationship. The new RLBA in the new RAID configuration definition is converted into the host LBA, and is converted into the read PLBA in the old RAID definition by this host LBA using the old RAID definition 80, and the data is read out. Also the new PLBA is converted into the write PLBA in the new RAID configuration definition 82, and the data which was read is written.

In this way, the LDE processing can be executed by the RAID mapping processing using the conventional PLBA, strip size, strip depth, stripe size and the number of member disks described in FIG. 4 to FIG. 7. Also the expansion processing and the RAID level conversion processing can be implemented in the same processing.

[Capacity Increase Processing/RAID Level Conversion Processing]

Figure 25:
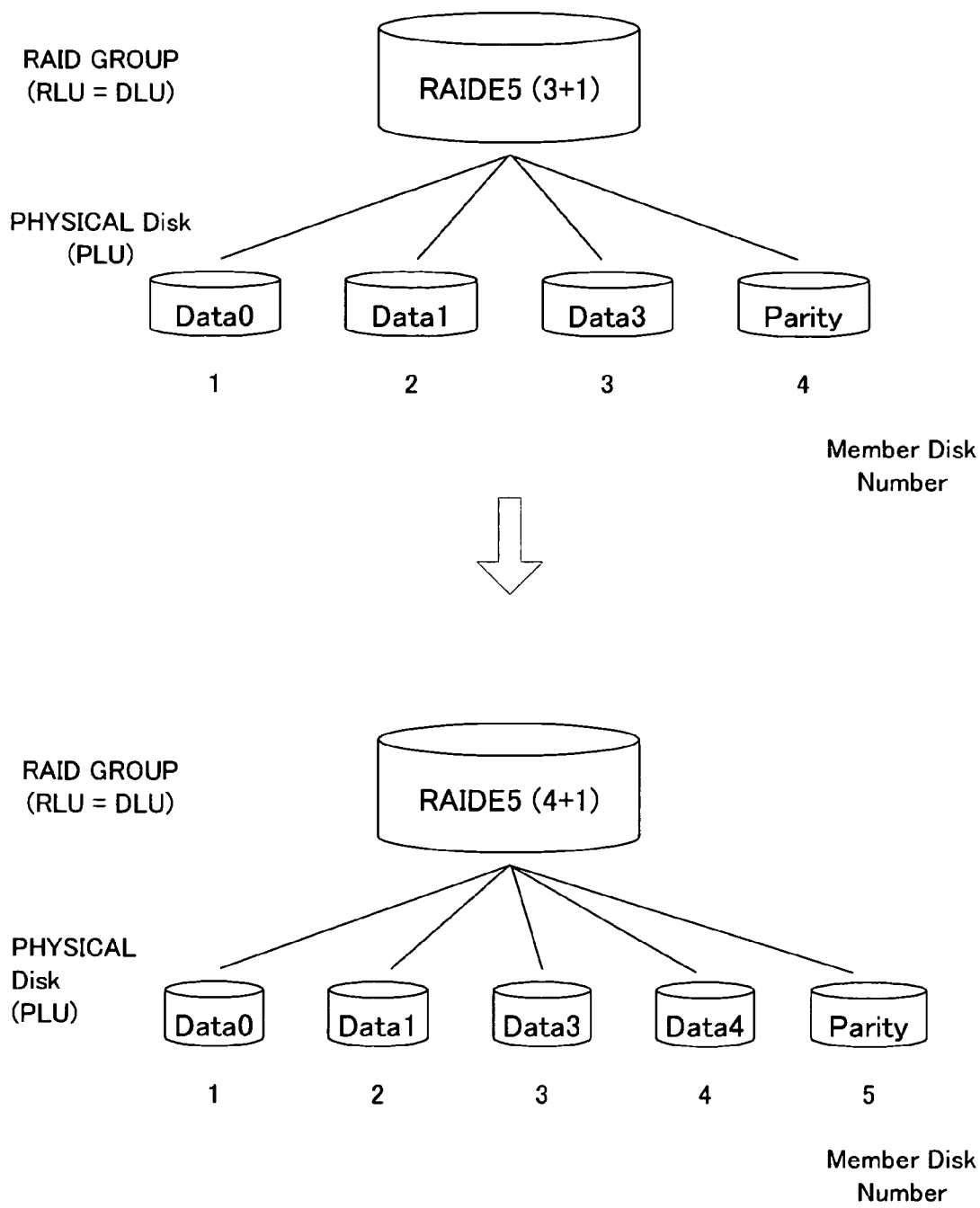
FIG. 25 is a diagram depicting the capacity increase based on the new and old RAID definitions in FIG. 24.

FIG. 24 is a table describing the old RAID definition and the new RAID definition when the capacity is increased, and FIG. 25 is a diagram depicting operation thereof. As FIG. 24 shows, the old (temporary) RAID definition 80 defines the RAID level 5, 3+1 (PLUNs 10–13), the number of member disks 4 and the number of blocks 400. On the other hand, the new RAID definition 82 defines the RAID level 5, 4+1 (PLUNs 10–14), the number of member disks 5 and the number of blocks 500.

As described in FIG. 4 and FIG. 5, mapping is changed by an increase in the number of member disks, and RAID 5 (3+1) is expanded to RAID 5 (4+1), as shown in FIG. 25.

Figure 28:
FIG. 28 is a diagram depicting the transition of the RLU table and the DLU table based on the RAID level conversion in FIG. 27.

FIG. 26 is a table describing the old RAID definition and the new RAID definition when the RAID level is converted, FIG. 27 is a diagram depicting operation thereof, and FIG. 28 is a diagram depicting the transition of the RLU table and the DLU table.

FIG. 26 shows the old (temporary) RAID definition 80 defines the RAID level 0+1, number of member disk 4 (PLUNs 0–3), and the number of blocks 400. On the other hand, the new RAID definition 82 defines RAID level 5, 3+1 (PLUNs 0–3), the number of member disks 4, and number of blocks 400.

As described in FIG. 6 and FIG. 7, the stripe of RAID 0+1 is read, and as described in FIG. 4 and FIG. 5, mapping is changed by the definition of RAID 5, and as FIG. 27 shows, RAID 0+1 (4+4) is level-converted to RAID 5 (3+1). By this, as FIG. 28 shows, the RLU table 72 and the DLU table 74 are changed from the definition of RAID 0+1 to RAID 5.

[Other Embodiments]

Figure 29:
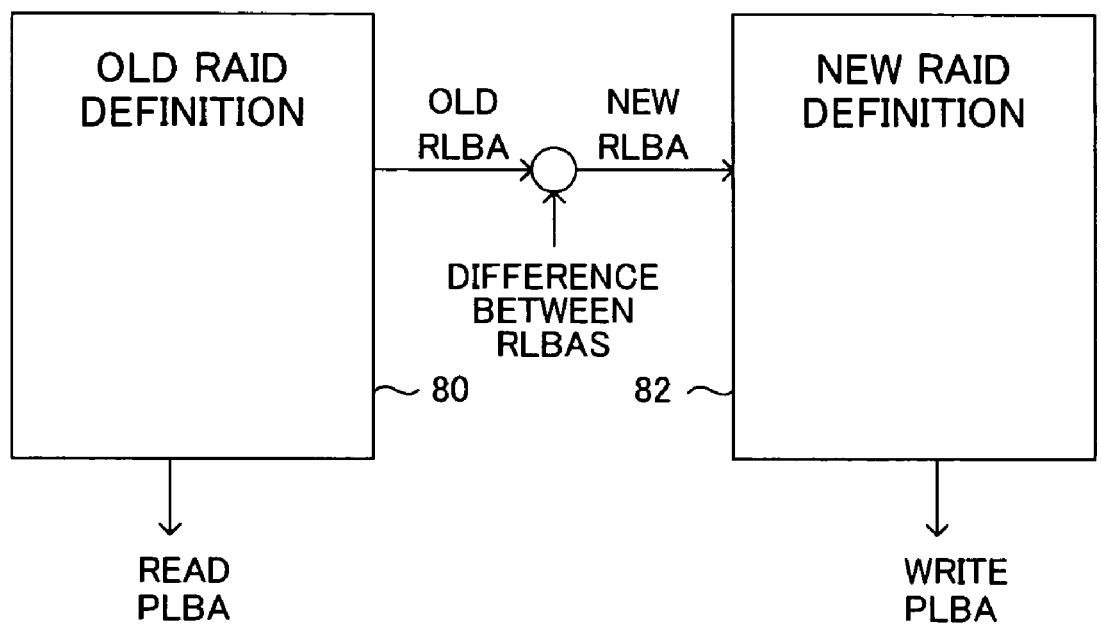
FIG. 29 is a diagram depicting the read/write address conversion according to another embodiment of the present invention.

FIG. 29 is a diagram depicting another address conversion of the present invention. In this embodiment, the difference of RLBAs between the RAID configuration definitions which became the target of conversion is determined in the table in advance, and the read PLBA in the old RAID definition is calculated with the RLBA in the old RAID definition.

A new RLBA is determined by adding the difference between the RLBAs to the RLBA in the old RAID definition, and the write PLBA is calculated with the new RAID definition 82. This way takes time for calculating the difference between the RLBAs, but mapping conversion can be performed at high-speed.

The above embodiment was described with a 2 CM (controllers)-4 DE (device enclosures) configuration, but each CM can perform LDE processing in the same way for a 4CM-16DE configuration, which has 4 controllers, by starting up LDE by the maintenance PC 3.

In the above embodiment, the RAID level shown in FIG. 12 was used for description, but the present invention can be applied to the storage system in other RAID levels (RAID 2, RAID 3, RAID 4). For the physical disk, a magnetic disk, optical disk, magneto-optical disk and various types of storage devices can be applied.

The present invention was described using the embodiments, but the present invention can be modified in various ways within the scope of the essential character of the present invention, and these shall not be excluded from the scope of the present invention.

In this way, the present invention uses the new and old RAID configuration definition information which defines at least the RAID level and the number of logical devices, and RLU mapping is performed by the respective RAID configuration definition information, and the RAID configuration is changed, so various RAID level conversions and a capacity increase can be implemented in an active status.

What is claimed is:

1. A RAID apparatus for separating data according to a RAID configuration definition and reading/writing the data from/to a plurality of physical disk devices in parallel, comprising:

a control unit for accessing said plurality of physical disk devices according to RLU (RAID logical unit) mapping based on said RAID configuration definition upon an I/O request from a host device;

a table for storing old RAID configuration definition information which defines at least an old RAID level and a number of old logical devices, and new RAID configuration definition information which defines at least a new RAID level and a number of new logical devices; and a cache memory for temporarily storing data for changing the old RAID configuration to the new RAID configuration, wherein said control unit reads out the data from said plurality of physical disk devices to said cache memory according to the RAID logical unit mapping based on said old RAID configuration definition of said table, and writes the data which was read out to said cache memory to said plurality of physical disk devices according to the RAID logical unit mapping based on said new RAID configuration definition of said table in an active status.

2. The RAID apparatus according to claim 1, wherein said control unit performs RAID level conversion processing by reading out the data from said plurality of physical disk devices to said cache memory according to the RLU mapping based on the RAID level of said old RAID configuration definition, and writing the data which was read out to said cache memory to said plurality of physical disk devices according to the RLU mapping based on the RAID level of said new RAID configuration definition.

3. The RAID apparatus according to claim 1, wherein said control unit performs capacity increase processing by reading out the data from said plurality of physical disk devices to said cache memory according to the RLU mapping based on said number of logical devices in said old RAID configuration definition, and writing the data which was read out to said cache memory to said plurality of physical disk devices according to the RLU mapping based on said number of logical devices in said new RAID configuration definition.

4. The RAID apparatus according to claim 1, wherein said control unit executes conversion from said old RAID configuration to said new RAID configuration sequentially and manages the progress status thereof, as well as judges whether an I/O request sent from said host device is for a converted area during said conversion, executes said I/O request using said new RAID configuration definition when the I/O request is for a converted area, and executes said I/O request using said old RAID configuration definition when the I/O request is for an unconverted area.

5. The RAID apparatus according to claim 1, wherein said control unit converts RLBA (RAID logical block address) based on the new RAID configuration definition to the host LBA (logical block address), then reads out the data from said plurality of physical disk devices to said cache memory according to the RAID logical unit mapping based on said old RAID configuration definition using said host logical block address, and writes the data which was read out to said cache memory to said plurality of physical disk devices according to the RAID logical unit mapping based on said new RAID configuration definition using said RAID logical block address.

6. The RAID apparatus according to claim 1, wherein said control unit converts said old RAID configuration into said new RAID configuration, and then deletes said old RAID configuration definition from said table.

7. The RAID apparatus according to claim 1, wherein said control unit creates said new RAID configuration definition in said table according to the instructed parameters of the new RAID configuration definition and said old RAID configuration definition.

8. The RAID apparatus according to claim 1, wherein said control unit acquires an area of said cache memory corresponding to a conversion area, and then executes conversion from said old RAID configuration into said new RAID configuration sequentially.

9. The RAID apparatus according to claim 8, wherein said control unit separates said conversion processing into sections and executes the processing a plurality of times when the area of said cache memory corresponding to said conversion area cannot be acquired.

10. The RAID apparatus according to claim 1, wherein said control unit performs said RLU mapping according to a strip depth and stripe size corresponding to the stripe of said RAID configuration.

11. A logical device expansion method for a RAID apparatus which separates data according to a RAID configuration definition and reads/writes the data to a plurality of physical disk devices in parallel, comprising the steps of:
reading out the data from said plurality of physical disk devices to a cache memory according to an RLU (RAID logical unit) mapping based on an old RAID configuration definition information which defines at least an old RAID level and a number of old logical devices; and
writing the data which was read out to said cache memory to said plurality of physical disk devices according to an RAID logical unit mapping based on a new RAID configuration definition information which defines at least a new RAID level and a number of new logical devices,
wherein said reading and writing are executed in an active status.

12. The logical device expansion method according to claim 11, wherein said reading step comprises a step of reading out the data from said plurality of physical disk devices to said cache memory according to an RLU mapping based on the RAID level of said old RAID configuration definition, and
said writing step comprises a step of writing the data which was read out to said cache memory to said plurality of physical disk devices according to an RLU mapping based on the RAID level of said new RAID configuration definition.

13. The logical device expansion method according to claim 11, wherein said reading step comprises a step of reading the data from said plurality of physical disk devices to said cache memory according to an RLU mapping based on said number of logical devices of said old RAID configuration definition, and
said writing step comprises a capacity increase step of writing the data which was read out to said cache memory to said plurality of physical disk devices according to an RLU mapping based on said number of logical devices of said new RAID configuration definition.

14. The logical device expansion method according to claim 11, further comprising the steps of:
managing the progress status of executing conversion from said old RAID configuration into said new RAID configuration sequentially;
judging whether an I/O request sent from a host device is for a converted area during said conversion;
executing said I/O request using said new RAID configuration definition when the I/O request is for a converted area; and
executing said I/O request using said old RAID configuration definition when the I/O request is for an unconverted area.

15. The logical device expansion method according to claim 11, wherein said reading step comprises a step of converting RLBA (RAID logical block address) based on the new RAID configuration definition to a host LBA (logical block address), and then reading out the data from said plurality of physical disk devices to said cache memory according to an RLU (RAID logical unit) mapping based on said old RAID configuration definition using said host logical block address, and
said writing step comprises a step of writing the data which was read out to said cache memory to said plurality of physical disk devices according to an RAID logical unit mapping based on said new RAID configuration definition using said RAID logical block address.

16. The logical device expansion method according to claim 11, further comprising a step of deleting said old RAID configuration definition after said conversion of said old RAID configuration into said new RAID configuration.

17. The logical device expansion method according to claim 11, further comprising a step of creating said new RAID configuration definition in the table according to the instructed parameters of the new RAID configuration definition and said old RAID configuration definition.

18. The logical device expansion method according to claim 11, further comprising a step of acquiring an area of said cache memory corresponding to a conversion area, and then executing conversion from said old RAID configuration into said new RAID configuration sequentially.

19. The logical device expansion method according to claim 18, further comprising a step of separating said conversion processing into sections and executing the processing a plurality of times when the area of said cache memory corresponding to said conversion area cannot be acquired.

20. The logical device expansion method according to claim 11, further comprising a step of performing said RLU mapping according to a strip depth and stripe size corresponding to the stripe of said RAID configuration.

* * * * *